US012327457B2

(12) United States Patent
Puckeridge et al.

(10) Patent No.: US 12,327,457 B2
(45) **Date of Patent: *Jun. 10, 2025**

(54) GAMES USING FINANCIAL INDICATORS AS RANDOM NUMBER GENERATORS

(71) Applicant: CFPH, LLC, New York, NY (US)

(72) Inventors: David A. Puckeridge, London (GB); Andrew Garrood, London (GB); Paul Johal, London (GB)

(73) Assignee: CFPH, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/614,927

(22) Filed: Mar. 25, 2024

(65) Prior Publication Data

US 2024/0233483 A1 Jul. 11, 2024

Related U.S. Application Data

(63) Continuation of application No. 18/177,823, filed on Mar. 3, 2023, now Pat. No. 11,972,664, which is a continuation of application No. 17/503,665, filed on Oct. 18, 2021, now Pat. No. 11,600,138, which is a continuation of application No. 16/241,447, filed on (Continued)

(51) Int. Cl.
*G07F 17/32* (2006.01)

(52) U.S. Cl.
CPC ........ *G07F 17/323* (2013.01); *G07F 17/3244* (2013.01); *G07F 17/3288* (2013.01)

(58) Field of Classification Search
CPC .... G07F 17/32; G07F 17/323; G07F 17/3244; G07F 17/326; G07F 17/3286; G07F 17/3288; G07F 17/3225; G07F 17/3272
See application file for complete search history.

(56) References Cited

U.S. PATENT DOCUMENTS

| | | | | |
|---|---|---|---|---|
| 6,227,542 B1 * | 5/2001 | Cosmi | | A63F 5/00 273/142 E |
| 7,711,628 B2 * | 5/2010 | Davie | | G06Q 50/34 705/37 |

(Continued)

FOREIGN PATENT DOCUMENTS

| | | |
|---|---|---|
| CA | 2564324 | 12/2005 |
| JP | 2007536313 | 12/2007 |
| JP | 2010273866 | 12/2010 |

*Primary Examiner* — Milap Shah

(57) ABSTRACT

According to various systems and methods, financial indicators may be used as random number generators to determine variables, such as numbers and cards, for various games, including casino-style games like roulette and poker. Players may place wagers relating to one or more game variables, such as one or more cards, hands, a roulette wheel spin, a lottery number, or other variable or outcome of a game. After bets are received, one or more random numbers may be determined based on one or more financial indicators, such as a least significant digit of the price or value of a financial instrument, index, or financial metric at a specific time. The random number(s) may be used to determine game variables, such as a winning lottery number, slot reel values, or numbers and suits of cards dealt. In some embodiments, players may select one or more financial instruments or indicators that will be used to resolve one or more game variables.

13 Claims, 31 Drawing Sheets

Related U.S. Application Data

Jan. 7, 2019, now Pat. No. 11,151,836, which is a continuation of application No. 14/181,624, filed on Feb. 14, 2014, now Pat. No. 10,192,396.

(60) Provisional application No. 61/768,410, filed on Feb. 23, 2013, provisional application No. 61/764,988, filed on Feb. 14, 2013.

(56) References Cited

U.S. PATENT DOCUMENTS

| | | | | |
|---|---|---|---|---|
| 7,835,961 | B2 * | 11/2010 | Davie | G06Q 40/04 705/37 |
| 8,608,549 | B2 | 12/2013 | Kido | |
| 8,727,868 | B1 * | 5/2014 | O'Brien | G07F 17/3288 463/31 |
| 8,727,869 | B1 * | 5/2014 | O'Brien | G07F 17/326 463/31 |
| 10,192,396 | B2 * | 1/2019 | Puckeridge | G07F 17/3244 |
| 11,151,836 | B2 * | 10/2021 | Puckeridge | G07F 17/323 |
| 11,600,138 | B2 * | 3/2023 | Puckeridge | G07F 17/323 |
| 11,972,664 | B2 * | 4/2024 | Puckeridge | G07F 17/3288 |
| 2004/0210507 | A1 * | 10/2004 | Asher | G07F 17/3288 705/37 |
| 2005/0027643 | A1 * | 2/2005 | Amaitis | G06Q 40/04 705/37 |
| 2005/0245308 | A1 * | 11/2005 | Amaitis | G07F 17/34 463/20 |
| 2005/0245310 | A1 * | 11/2005 | Amaitis | G07F 17/3286 463/20 |
| 2006/0105840 | A1 * | 5/2006 | Graeve | A63F 3/00157 463/42 |
| 2006/0199631 | A1 * | 9/2006 | McGill | G07F 17/32 463/16 |
| 2008/0275824 | A1 * | 11/2008 | Assia | G07F 17/3255 705/36 R |
| 2009/0062016 | A1 * | 3/2009 | Assia | G07F 17/3255 705/36 R |
| 2009/0117968 | A1 * | 5/2009 | Krietemeyer | G07F 17/3258 463/18 |
| 2009/0163266 | A1 * | 6/2009 | Amaitis | G07F 17/34 463/20 |
| 2009/0186678 | A1 * | 7/2009 | Tirosh | G06Q 30/08 463/16 |
| 2009/0209312 | A1 * | 8/2009 | Alderucci | G07F 17/329 463/17 |
| 2009/0209321 | A1 * | 8/2009 | Alderucci | G07F 17/3293 463/22 |
| 2010/0009743 | A1 * | 1/2010 | Amaitis | G07F 17/3288 463/25 |
| 2010/0274702 | A1 * | 10/2010 | Tzroya | G06Q 40/04 705/37 |
| 2012/0295698 | A1 * | 11/2012 | Demino | G07F 17/3288 463/28 |
| 2014/0287819 | A1 * | 9/2014 | O'Brien | G06Q 50/34 463/25 |
| 2014/0309014 | A1 * | 10/2014 | O'Brien | G07F 17/326 463/20 |

* cited by examiner

The Financials Roulette betting interface

About to bet on 9

Bet on 9 placed • Market Bets - Summary view (bet losing)

Bet on 9 placed • Market Bets - Summary view (bet winning)

Market Bets – Detail view (fast losing)

Market Bets -- Detail view (bet winning)

Previous market bets -- bet on 9 lost as market settled with digit 4

About to bet on Red

Bet on Red • Market Bets -- Summary view (bet losing)

Previous market bets – bet on Red won as market settled with digit 0

5 bets placed – on 2, 4, 7, 9 and Black • Market Bets – Summary view 5 bets placed -- on 2, 4, 7, 9 and Black • Market Bets -- Detail view All bets closed/settled Alternate History view Popup ⓘ information

GAMES USING FINANCIAL INDICATORS AS RANDOM NUMBER GENERATORS

CROSS-REFERENCE TO RELATED APPLICATION

This application is a continuation of U.S. patent application Ser. No. 18/177,823 filed Mar. 3, 2023, which is a continuation of U.S. patent application Ser. No. 17/503,665 filed Oct. 18, 2021 (now U.S. Pat. No. 11,600,138 issued Mar. 7, 2023), which is a continuation of U.S. patent application Ser. No. 16/241,447 filed Jan. 7, 2019 (now U.S. Pat. No. 11,151,836 issued Oct. 19, 2021), which is a continuation of U.S. patent application Ser. No. 14/181,624 filed Feb. 14, 2014 (now U.S. Pat. No. 10,192,396 issued Jan. 29, 2019), which claims the benefit of U.S. Provisional Application No. 61/768,410 filed Feb. 23, 2013 and U.S. Provisional Application No. 61/764,988 filed Feb. 14, 2013, each of which is incorporated by reference herein in its entirety.

FIELD OF THE INVENTION

The present invention generally relates to games of chance, and more particularly to systems and methods for implementing games and managing wagers wherein a wagering result is resolved based at least in part on one or more financial market outcomes, values, and/or events.

BACKGROUND

Games of chance allow users to make bets regarding an outcome of a game, such as poker or roulette. In many games, the outcome is determined randomly, e.g., by dealing cards from a shuffled deck, or by allowing a roulette ball to fall randomly into one of many numbered slots. For example, in traditional roulette games, a moving ball lands on a random slot of a roulette wheel. Gamblers may place wagers in advance concerning where (on which slot number or slot type, red or black) the ball will land.

In electronic versions of these games, computers are used to determine random cards for poker and random slot numbers for roulette.

BRIEF SUMMARY OF THE INVENTION

Various embodiments of the present invention relate to an electronic poker type game in which the outcome of the game is tied to the outcome of an event such as a value of a financial market at a particular time, e.g., in the future.

Various embodiments of the present invention relate to an electronic roulette type game in which the outcome of the game is tied to the outcome of an event such as a value of a financial market at a particular time, e.g., in the future.

According to various systems and methods, financial indicators may be used as random number generators to determine variables, such as numbers and cards, for various games, including casino-style games like roulette and poker. Players may place wagers relating to one or more game variables, such as one or more cards, hands, a roulette wheel spin, a lottery number, or other variable or outcome of a game. After bets are received, one or more random numbers may be determined based on one or more financial indicators, such as a least significant digit of the price or value of a financial instrument, index, or financial metric at a specific time. The random number(s) may be used to determine game variables, such as a winning lottery number, slot reel values, or numbers and suits of cards dealt. In some embodiments, players may select one or more financial instruments or indicators that will be used to resolve one or more game variables.

BRIEF DESCRIPTION OF THE FIGURES

To provide a more complete understanding of the present invention and features and advantages thereof, reference is made to the following description, taken in conjunction with the accompanying figures, wherein like reference numerals represent like parts, in which.

DETAILED DESCRIPTION

Figure 1:
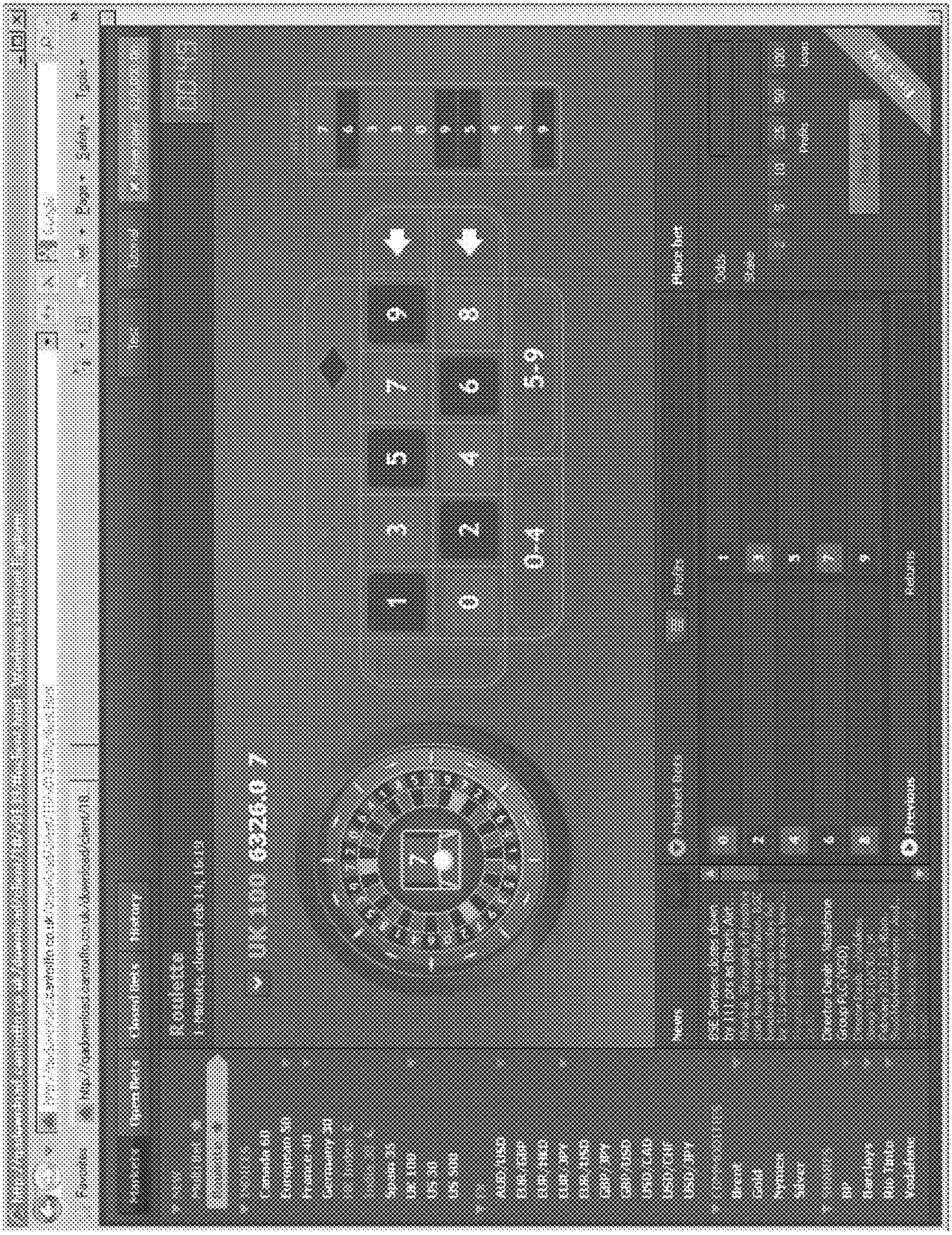
FIG. 1 depicts an exemplary user interface according to an embodiment according to an embodiment.

The following sections I-XI provide a guide to interpreting the present application.

I. Terms

The term "product" means any machine, manufacture and/or composition of matter, unless expressly specified otherwise.

The term "process" means a process, algorithm, method, or the like, unless expressly specified otherwise.

Each process (whether called a method, algorithm or otherwise) inherently includes one or more steps, and therefore all references to a "step" or "steps" of a process have an inherent antecedent basis in the mere description of a process, or in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the invention", unless expressly specified otherwise.

The term "variation" of an invention means an embodiment of the invention, unless expressly specified otherwise.

The term "indication" is used in an extremely broad sense. An "indication" of a thing should be understood to include anything that may be used to determine the thing.

An indication of a thing may include an electronic message that identifies the thing (e.g., an identification of a widget by a serial number affixed to the widget, an identification of a widget by one or more characteristics of the widget). An indication of a thing may include information that may be used to compute and/or look-up a thing (e.g., information identifying a machine of which a widget is a part that may be used to determine the widget). An indication of a thing may specify things that are related to the thing (e.g., characteristics of the thing, a name of the thing, a name of a thing related to the thing). An indication of a thing may not specify things that are related to the thing (e.g., a letter "a" may be an indication of a widget of a computer system that is configured to interpret the letter "a" to identify the widget). An indication of a thing may include a sign, a symptom, and/or a token of the thing. An indication, for example, may include a code, a reference, an example, a link, a signal, and/or an identifier. An indication of a thing may include information that represents, describes, and/or otherwise is associated with the thing.

A transformation of an indication of a thing may be an indication of the thing (e.g., an encrypted indication of a thing may be an indication of the thing). An indication of a thing may include the thing itself, a copy of the thing, and/or a portion of the thing. An indication of a thing may be meaningless to a thing that is not configured to understand the indication (e.g., a person may not understand that a letter "a" indicates a widget, but it may nonetheless be an indication of the widget because the computer system may determine the widget from the letter "a"). It should be understood that the fact that an indication of a thing may be used to determine the thing does not mean that the thing or anything else is determined. An indication of a thing may include an indication of any number of the thing unless specified otherwise. An indication of a thing may include an indication of other things (e.g., an electronic message that indicates may things). (Indication can be used as a very broad term in claim language. For example: receiving an indication of a financial instrument.)

The term "represent" means (1) to serve to express, designate, stand for, or denote, as a word, symbol, or the like does; (2) to express or designate by some term, character, symbol, or the like; (3) to portray or depict or present the likeness of, as a picture does; or (4) to serve as a sign or symbol of.

A reference to "another embodiment" in describing an embodiment does not imply that the referenced embodiment is mutually exclusive with another embodiment (e.g., an embodiment described before the referenced embodiment), unless expressly specified otherwise. Similarly, the mere fact that two (or more) embodiments are referenced does not imply that those embodiments are mutually exclusive.

One embodiment of the invention may include or cover or embrace more than one other embodiment of the invention. For example, a first embodiment comprising elements a, b, and c may cover a second embodiment that comprises elements a, b, c, and d as well as a third embodiment covering elements a, b, c, and e. Similarly, each of the first, second, and third embodiments may cover a fourth embodiment comprising elements a, b, c, d, and e.

The terms "including", "comprising" and variations thereof mean "including but not necessarily limited to", unless expressly specified otherwise. Thus, for example, the sentence "the machine includes a red widget and a blue widget" means the machine includes the red widget and the blue widget, but may possibly include one or more other items as well.

The term "consisting of" and variations thereof mean "including and also limited to", unless expressly specified otherwise. Thus, for example, the sentence "the machine consists of a red widget and a blue widget" means the machine includes the red widget and the blue widget, but does not include anything else.

The term "compose", and variations thereof mean "to make up the constituent parts of, component of or member of", unless expressly specified otherwise. Thus, for example, the sentence "the red widget and the blue widget compose a machine" means the machine includes the red widget and the blue widget.

The term "exclusively compose" and variations thereof mean "to make up exclusively the constituent parts of, to be the only components of, or to be the only members of", unless expressly specified otherwise. Thus, for example, the sentence "the red widget and the blue widget exclusively compose a machine" means the machine consists of the red widget and the blue widget (i.e., and nothing else).

The terms "a", "an" and "the" refer to "one or more", unless expressly specified otherwise. Thus, for example, the phrase "a widget" means one or more widgets, unless expressly specified otherwise. Similarly, after reciting the phrase "a widget", a subsequent recitation of the phrase "the widget" means "the one or more widgets". Accordingly, it should be understood that the word "the" may also refer to a specific term having antecedent basis. For example, if a paragraph mentions "a specific single feature" and then refers to "the feature," then the phrase "the feature" should be understood to refer to the previously mentioned "a specific single feature." (It should be understood that the term "a" in "a specific single feature" refers to "one" specific single feature and not "one or more" specific single features.)

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things), means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car, and a wheel. The phrase "at least one of", when such phrase modifies a plurality of things does not mean "one of each of" the plurality of things. For example, the phrase "at least one of a widget, a car and a wheel" does not mean "one widget, one car and one wheel".

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" covers both "based only on" and "based at least on". The phrase "based at least on" is equivalent to the phrase "based at least in part on". For example, the phrase "element A is calculated based on element B and element C" covers embodiments where element A is calculated as the product of B times C (in other words, A=B×C), embodiments where A is calculated as the sum of B plus C (in other words, A=B+C), embodiments where A is calculated as a product of B times C times D, embodiments where A is calculated as a sum of the square root of B plus C plus D times E, and so on.

The term "represent" and like terms are not exclusive, unless expressly specified otherwise. For example, the term "represents" does not mean "represents only", unless expressly specified otherwise. For example, the phrase "the data represents a credit card number" covers both "the data represents only a credit card number" and "the data represents a credit card number, and the data also represents something else".

The term "whereby" is used herein only to precede a clause or other set of words that express only the intended result, objective, or consequence of something that is explicitly recited before the term "whereby". Thus, when the term "whereby" is used in a claim, the clause, or other words that the term "whereby" modifies do not establish specific further limitations of the claim or otherwise restrict the meaning or scope of the claim.

The terms "e.g.", "such as" and like terms mean "for example", and thus do not limit the term or phrase they explain. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first of the two machines has a function, and the second of the two machines has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

A numerical range includes integers and non-integers in the range, unless expressly specified otherwise. For example, the range "1 to 10" includes the integers from 1 to 10 (e.g., 1, 2, 3, 4, . . . 9, 10) and non-integers (e.g., 1.0031415926, 1.1, 1.2, . . . 1.9).

Where two or more terms or phrases are synonymous (e.g., because of an explicit statement that the terms or phrases are synonymous), instances of one such term or phrase does not mean instances of another such term or phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, the determination of an object which meets a certain criterion) is used in an extremely broad sense. The term "determining" encompasses a wide variety of actions and therefore "determining" can include calculating, computing, processing, deriving, investigating, looking up (e.g., looking up in a table, a database, or another data structure), rendering into electronic format or digital representation, ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing, averaging and the like.

The term "determining" does not imply that mathematical processing must be performed, and does not imply that numerical methods must be used, and does not imply that an algorithm is used.

The term "determining" does not imply that any particular device must be used. For example, a computer need not necessarily perform the determining.

The term "determining" may include "calculating." The term "calculating" should be understood to include performing one or more calculations. Calculating may include computing, processing, and/or deriving. Calculating may be performed by a computing device. For example, calculating a thing may include applying an algorithm to data by a computer processor and generating the thing as an output of the processor.

The term "determining" may include "referencing." The term "referencing" should be understood to include making one or more reference, e.g., to a thing. Referencing may include querying, accessing, selecting, choosing, reading, and/or looking-up. The act of referencing may be performed by a computing device. For example, referencing a thing may include reading a memory location in which the thing is stored by a processor.

The term "determining" may include "receiving." For example, receiving a thing may include taking in the thing. In some embodiments, receiving may include acts performed to take in a thing, such as operating a network interface through which the thing is taken in. In some embodiments, receiving may be performed without acts performed to take in the thing, such as in a direct memory write or a hard wired circuit. Receiving a thing may include receiving a thing from a remote source that may have calculated the thing.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to that limitation (e.g., "the widget"), this mere usage does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term, but that ordinal number does not have any other meaning or limiting effect—it is merely a convenient name. For example, a "first widget" may be so named merely to distinguish it from, e.g., a "second widget." Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. The mere usage of ordinal numbers does not define a numerical limit to the features identified with the ordinal numbers. For example, the mere usage of the ordinal numbers "first" and "second" before the term "widget" does not indicate that there are exactly two widgets.

When a single device, article or other product is described herein, in another embodiment more than one device or article (whether or not they cooperate) may alternatively be used in place of the single device or article that is described. Accordingly, the functionality that is described as being possessed by a device may alternatively be possessed by more than one device or article (whether or not they cooperate) in another embodiment.

Similarly, where more than one device, article or other product is described herein (whether or not they cooperate), in another embodiment a single device or article may alternatively be used in place of the more than one device or article that is described. For example, a plurality of computer-based devices may be substituted with a single computer-based device. In some embodiments, such a plurality of computer-based devices may operate together to perform one step of a process such as is common in grid computing systems. In some embodiments, such a plurality of computer-based devices may operate provide added functionality to one another so that the plurality may operate to perform one step of a process such as is common in cloud computing systems. (Conversely, a single computer-based device may be substituted with multiple computer-based devices operating in cooperation with one another. For example, a single computing device may be substituted with a server and a workstation in communication with one another over the internet) Accordingly, the various functionality that is described as being possessed by more than one device or article may alternatively be possessed by a single device or article.

The functionality and/or the features of a single device that is described may in another embodiment, be alternatively embodied by one or more other devices which are described but are not explicitly described as having such functionality or features. Thus, other embodiments need not include the described device itself, but rather can include the one or more other devices which would, in those other embodiments, have such functionality or features.

IV. Disclosed Examples and Terminology Are Not Limiting

Neither the Title (set forth at the beginning of the first page of the present application) nor the Abstract (set forth at the end of the present application) is to be taken as limiting in any way the scope of the disclosed invention, is to be used in interpreting the meaning of any claim or is to be used in limiting the scope of any claim. An Abstract has been included in this application merely because an Abstract is required under 37 C.F.R. § 1.72(b).

The headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The disclosed invention is widely applicable to numerous embodiments, as is readily apparent from the disclosure. One of ordinary skill in the art will recognize that the disclosed invention may be practiced with various modifications and alterations, such as structural, logical, software, and electrical modifications. Although particular features of the disclosed invention may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not be interpreted as requiring features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or (with respect to a claim and the invention defined by that claim) expressly recited in that claim.

Any preambles of the claims that recite anything other than a statutory class shall be interpreted to recite purposes, benefits and possible uses of the claimed invention, and such preambles shall not be construed to limit the claimed invention.

The present disclosure is not a literal description of all embodiments of the invention. Also, the present disclosure is not a listing of features of the invention which must be present in all embodiments.

All disclosed embodiments are not necessarily covered by the claims (even including all pending, amended, issued, and canceled claims). In addition, a disclosed embodiment may be (but need not necessarily be) covered by several claims. Accordingly, where a claim (regardless of whether pending, amended, issued, or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries. Devices are in communication with one another if they are capable of at least one-way communication with one another. For example, a first device is in communication with a second device if the first device is capable of transmitting information to the second device. Similarly, the second device is in communication with the first device if the second device is capable of receiving information from the first device.

A description of an embodiment with several components or features does not imply that all or even any of such components or features are required. On the contrary, a variety of optional components are described to illustrate the wide variety of possible embodiments of the present invention. Unless otherwise specified explicitly, no component or feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not imply that all or any of the steps are preferred, essential or required. Various other embodiments within the scope of the described invention include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, and a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

The term "compute" shall mean to determine using a processor in accordance with a software algorithm.

A "processor" means one or more microprocessors, central processing units (CPUs), computing devices, microcontrollers, digital signal processors, graphics processing units (GPUs) or like devices or any combination thereof, regardless of the architecture (e.g., chip-level multiprocessing or multi-core, RISC, CISC, Microprocessor without Interlocked Pipeline Stages, pipelining configuration, simultaneous multithreading, microprocessor with integrated graphics processing unit, GPGPU).

A "computing device" means one or more microprocessors, central processing units (CPUs), computing devices, microcontrollers, digital signal processors, graphics card, mobile gaming device, or like devices or any combination thereof, regardless of the architecture (e.g., chip-level multiprocessing or multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process. For example, a description of a process is a description of an apparatus comprising a processor and memory that stores a program comprising instructions that, when executed by the processor, direct the processor to perform the method.

The apparatus that performs the process can include a plurality of computing devices that work together to perform the process. Some of the computing devices may work together to perform each step of a process, may work on separate steps of a process, may provide underlying services that other computing devices that may facilitate the performance of the process. Such computing devices may act under instruction of a centralized authority. In another embodiment, such computing devices may act without instruction of a centralized authority. Some examples of apparatus that may operate in some or all of these ways may include grid computer systems, cloud computer systems, peer-to-peer computer systems, computer systems configured to provide software as a service, and so on. For example, the apparatus may comprise a computer system that executes the bulk of its processing load on a remote server, but outputs display information to and receives user input information from a local user computer, such as a computer system that executes VMware software.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves, and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

The term "tangible computer-readable medium" refers to a "computer-readable medium" that comprises a hardware component, such as optical or magnetic disks.

Various forms of computer readable media may be involved in carrying data (e.g., sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), wireless local area network communication defined by the IEEE 802.11 specifications whether or not they are approved by the Wi-Fi Alliance, SAP, ATP, Bluetooth™, and TCP/IP, TDMA, CDMA, and 3G; and/or (iv) encrypted to ensure privacy or prevent fraud in any of a variety of ways well known in the art.

The term "database" refers to any electronically-stored collection of data that is stored in a retrievable format.

The term "data structure" refers to a database in a hardware machine such as a computer.

The term "network" means a series of points or nodes interconnected by communication paths. For example, a network can include a plurality of computers or communication devices interconnected by one or more wired and/or wireless communication paths. Networks can interconnect with other networks and contain subnetworks.

The term "predetermined" means determined beforehand, e.g., before a present time or a present action. For example, the phrase "displaying a predetermined value" means displaying a value that was determined before the act of displaying.

The term "condition" means (1) a premise upon which the fulfillment of an agreement depends, or (2) something essential to the appearance or occurrence of something else.

The term "transaction" means (1) an Exchange or transfer of goods, services, or funds, or (2) a communicative action or activity involving two parties or things that reciprocally affect or influence each other.

Thus a description of a process is likewise a description of a computer-readable medium storing a program for performing the process. The computer-readable medium can store (in any appropriate format) those program elements which are appropriate to perform the method. For example, a description of a process is a description of a computer-readable storage medium that stores a program comprising instructions that, when executed by a processor, direct the processor to perform the method.

Just as the description of various steps in a process does not indicate that all the described steps are required, embodiments of an apparatus include a computer or computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g., the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel®, Pentium®, or Centrino™, Atom™, or Core™ processor, that are adapted to communicate with the computer. Any number and type of devices may be in communication with the computer.

In an embodiment, a server computer or centralized authority may not be necessary or desirable. For example, the present invention may in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

As used herein, the term "encryption" refers to a process for obscuring or hiding information so that the information is not readily understandable without special knowledge. The process of encryption may transform raw information, called plaintext, into encrypted information. The encrypted information may be called ciphertext, and the algorithm for transforming the plaintext into ciphertext may be referred to as a cipher. A cipher may also be used for performing the reverse operation of converting the ciphertext back into plaintext. Examples of ciphers include substitution ciphers, transposition ciphers, and ciphers implemented using rotor machines.

In various encryption methods, ciphers may require a supplementary piece of information called a key. A key may consist, for example, of a string of bits. A key may be used in conjunction with a cipher to encrypt plaintext. A key may also be used in conjunction with a cipher to decrypt ciphertext. In a category of ciphers called symmetric key algorithms (e.g., private-key cryptography), the same key is used for both encryption and decryption. The sanctity of the encrypted information may thus depend on the key being kept secret. Examples of symmetric key algorithms are DES and AES. In a category of ciphers called asymmetric key algorithms (e.g., public-key cryptography), different keys are used for encryption and decryption. With an asymmetric key algorithm, any member of the public may use a first key (e.g., a public key) to encrypt plaintext into ciphertext. However, only the holder of a second key (e.g., the private key) will be able to decrypt the ciphertext back in to plaintext. An example of an asymmetric key algorithm is the RSA algorithm.

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112, Paragraph 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material, or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application will be prefaced by the phrase "does not include" or by the phrase "cannot perform".

IX. Incorporation By Reference

Any patent, patent application or other document referred to herein is incorporated by reference into this patent application as part of the present disclosure, but only for purposes of written description and enablement in accordance with 35 U.S.C. § 112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference. Conversely, the definitions provided in this application should not be used to limit, define, or otherwise construe any term of any document incorporated herein by reference. The definitions set forth explicitly in this application are controlling notwithstanding the description of particular embodiments that may be incompatible with the definition(s).

Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

DETAILED DESCRIPTION OF EXEMPLARY EMBODIMENTS

In various embodiments, financial market indicators and indicia may be used as a random number generator for one or more game variables, such as card numbers and suits (for card games), roulette wheel outcomes (for roulette), each reel of a slot machine (for slots), a lottery number (for lotteries), and other variables. For example, the game information or variable may be determined based on information associated with a financial market or indicia. For example, a game variable may be determined to be, or determined based on, the last digit of a specific financial market indicator or indicia at a specific time, such as 2 pm, 9:05 am, 3:26:17 pm, or any other time.

In some embodiments, game information such as the identity of the financial market (e.g., AUD/USD exchange rate or value of S&P 500) and the time of its measured value (e.g., exactly 5 seconds after 10:22 am, may be disclosed to players in advance. In other embodiments, some information, such as the time or identity of the financial market indicia, may not be disclosed to players in advance.

Various embodiments relate to a poker game in which one or more financial markets (such as five) may be shown, e.g., with their final digit highlighted in a specific color. The user can bet on one or more outcomes at settlement, such as 8 specific hands or "pair or better". The specific hands may include high number 9, one pair, two pairs, three of a kind, full house, straight, four of a kind, and five of a kind.

In various embodiments, a roulette game may be implemented via an electronic roulette wheel comprising various numbers or symbols such as the numbers 0 to 9, various colors such as black, red, and yellow, a single roulette ball, and one or more other features associated with traditional roulette wheels. The electronic ball or other indicia may come to rest upon (or the outcome may otherwise result in) any of number 0 to 9, e.g., and/or any of the colors, e.g., black or red. For example, a single outcome may comprise both a number (0-9) and a color (red, black, or yellow).

In some embodiments, a game outcome (such as a roulette outcome) may comprise a multi-digit number (e.g., 2 or 3 digits), e.g., based on the last digit of multiple financial indicators strung together. The order in which multiple financial market digits are strung together may be determined randomly at the time of the outcome or determined previously, e.g., before bets are accepted. In some embodiments, users may select the identity and order of the financial market indicators for determining the roulette outcome.

Game outcomes may be determined by an event such as a financial event or outcome, e.g., that occurs after the bet is placed. Exemplary financial events include a price or value of a financial product or market, e.g., at a specific (e.g., pre-determined) time. For example, the outcome of a particular roulette game may be determined based on a digit (e.g., the last or least significant digit, the first or second digit after a decimal place, or other digit) in a market price or value of a financial product or financial index, such as the S&P 500, at a particular time such as 2:00 pm on Feb. 14, 2013, e.g., as reported by a specific reporting agency or on a specific website such as Bloomberg.com. For example, if the value of the S&P 500 at such time is 1409.2 and the outcome is tied to the first digit after the decimal place, then the outcome of the roulette game may be "2" (which is the first digit after the decimal place). The roulette game may end, and bets may be resolved at the time the outcome is resolved, e.g., in real time or substantially real time.

In some embodiments, the roulette game may have an outcome based on a two-digit number, e.g., 00-99, or three-digit number, e.g., using the last digit of multiple different market indicators (e.g., or multiple digits of a single financial indicator, or two digits from one and one from another).

In some embodiments, the roulette wheel may have outcomes of 00-36 (like a traditional roulette wheel), wherein numbers above 36 are ignored in favor of a next-determined number. If an impermissible number such as 78 is determined based on the last digit of two market indicators, the system may discard this number in favor of the next measured number from the same indicator. For example, if the last digit is 7 and 8 for two indicators measured at the relevant time of the outcome, then the system may use the next measurement of these numbers (e.g., 0.001 seconds later), e.g., until a proper number is resolved between 00-36. If a number such as 39 is determined, the system may discard only the last digit (the 9) in favor of the next measured result of that indicator, or the next, until a proper number between 0-6 is resolved. Alternately, instead of using the same indicators at a different time, the system may discard an impermissible result in favor of digits of other indicators measured at the same time as the original result.

Accordingly, in some embodiments, the outcome of a financial event, such as the number of the least significant digit of a particular market or index at a particular time, may be used as a random number generator for a game such as a roulette game. In some embodiments, a future event may be used (such as a future value of a market at a particular future time) so that players cannot know the outcome in advance. In other embodiments, past information may be used, e.g., provided that the information is randomized in some way (e.g., the market value of the DJIA at 11:00 am on a randomly determined prior day). In some embodiments, the game may end at the time the outcome is resolved, e.g., at the time the market is determined.

Exemplary Roulette Games

FIG. 1 depicts an exemplary user interface according to an embodiment. The user interface may be used to play a game similar to roulette.

The game interface may be displayed at a user interface, such as a user computing device such as a touch-screen, phone, computer, or other device comprising a visual display. It should be appreciated that one, some, all, or any number of the various elements described below may be shown in a user interface in any suitable arrangement. User may select various elements, e.g., via mouse or touch-screen, to request betting information, place bets, clear a prior selection, change a stake, or perform any other gaming-related action.

The left side of the display may comprise various game options relating to game types and financial markets. Roulette may be highlighted in yellow to indicate that a roulette game has been selected here, and is currently being displayed. Alternately, the user may select another game type such as "Multi Bet."

Below the game types, the user may select a financial market or index, e.g., that will be used to generate the winning number in the roulette game. For example, the user may select an index such as Canada 60 or France 40, a foreign exchange market such as AUD/USD or EUR/GBP, a commodity market such as gold or silver, or a stock value such as BP shares or Barclays shares. Here, the UK100 market has been selected. Accordingly, the UK 100 index may be used to determine the winning number of the roulette game. The current (or substantially current) value of the UK100 (here, 6326.07) may be displayed on the gaming table area, indicated here in green. A drop-down icon to the left of the "UK 100" icon may be selected to generate a list of alternative markets that may be used for this game. In some embodiments, various options may be disabled or expire, e.g., at a predetermined time of the game, such as when the timer reaches 10 seconds, or on or just before the betting sessions ends.

The display may show a "gaming table" portion corresponding to elements of a real gaming table, highlighted here in green. As in a real roulette table, users may make bets by selecting one or more of the betting areas (e.g., by placing virtual chips on a selected area). The gaming table shows a roulette wheel with the numbers 0 to 9 and colors black, red, and yellow (e.g., wherein yellow indicates the currently winning number).

Above the roulette wheel a financial number may be displayed, such as a value (such as a current market value or other price) of financial market, instrument, or index such as the UK 100 as displayed here. (Other financial markets may be used, e.g., by selecting such market from the list to the left of the gaming table.) Here, the current value (at the moment this particular screen is shown) of the UK 100 index is shown to be 6372.57, wherein 7 is the last significant digit shown. The display may be continually or continuously updated to show the current value of the index in real time or substantially real time. The outcome of the roulette game may comprise the last significant digit of the UK 100 at the time the game ends. Accordingly, the number 7 could be considered the currently winning number, that is, the number that (if selected in a bet) would win if the game ended at that precise moment.

To the right of the roulette wheel a betting selection area is displayed, comprising red and black selection areas on top, and the numbers 0 to 9 listed separate boxes in the middle. At the bottom are two boxes labeled 0-4 and 5-9. On the right hand side of the table are two arrow boxes, one pointing to the odd numbers, one pointing to the even numbers.

On both the wheel and the betting area, the numbers 1, 2, 5, 6, and 9 appear in white on a black background (to indicate that they are "black" numbers), and the numbers 0, 3, 4, 7, and 8 are indicated in white on a red background (e.g., to indicate that they are "red" numbers). A bet on red may win when the result is a red number, and a bet on black may win when the result is a black number. On the roulette wheel, a yellow indicia may be displayed on or near the number "7" to indicate that "7" is the currently winning number.

To the right of the betting area, a history area may show a listing of the results of prior games, e.g., in chronological order. For example, the history area may indicate that the result of the last game was 7, the next last 6, the game prior to that 3, then 3, etc. Alternately, the history tab may show them in reverse chronological order, wherein the most recent result was 9 (at the bottom of the history area), next last was 4, etc.

On the upper right hand corner, a time display may display an amount of time. The amount of time may comprise the current time, an amount of time remaining in a betting session, an amount of time available to place bets during a betting session before betting closes, an amount of time a game has been played, an amount of time until the next game starts, or any other amount of time.

On the bottom right hand corner, the odds (e.g., for a selected bet or bet type) and stakes (e.g., of a selected bet or bet type) may be displayed. A place bet tab may also be displayed. The amount a user can win or lose on a bet may be shown in 'profits' and 'losses'. The profits and losses field may display an amount that a user has gained (and/or lost)

or could gain (or lose) in a current game, gaming session, day, week, period since last login, or other time period.

In some embodiments, the various values displayed may change right up until the moment the user clicks 'Place bet'. In the bottom middle of the screen is the Market Bets tab. In this tab, the user can track his/her bets and the profit and losses of each bet. The user can close his/her bets by clicking 'close' or 'close all.' A winning bet may be highlighted in blue. A losing bet may be highlighted in red. However, in some embodiments, closing a bet with a negative profit will result in less than the original stake being returned.

On the upper right hand corner of the screen, above the timer, Test, Tutorial, and Free Play tabs may be displayed. The Test tab may allow the user to see if the game is compatible with their computer. The Tutorial tab may offer a guide on how to play the game. The Free Play tab may offer the user an opportunity to play the game without any monetary considerations, e.g., using fake money or gaming credit at no cost to the player.

On the bottom left hand side or the screen, next to the Market Bets tab, a running ticker may display pertinent current events/news of the day. On top of the Roulette wheel on the screen is the market settle level of the country in question. The user may click on the down arrow and choose the various markets to bet on worldwide. In one embodiment of the invention, the countries listed include the US, Japan, and the UK. In some embodiments, the player may select a country, currency, financial index or market, or other parameter of the game. For example, a user may select "US" and "S&P 500", or may select "UK" and "FTSE 100", for example.

In one embodiment, a user bet may comprise a prediction of the final digit of the market settle level at a specific time (e.g., the end of the game). The bet may win if the market settle number (the final digit in the market settle level) equals the digit of the user's bet (or bet type, such as "even"), or comprises one of the digits or colors of a user's bet (e.g., when betting on red/black, odd/even, or high/low).

In some embodiments, games and associated betting sessions may start after (e.g., immediately after, or several seconds or minutes after) a prior one finishes. For example, a bet may start and/or stop every minute, for example. In some embodiments, a game may last one minute. During the first 50 seconds, players may join the game, configure settings, and configure and place bets. Betting may be closed at the end of 50 seconds. The game may conclude, and bets may be resolved and paid, at the end of 60 seconds. Other times and timings may be contemplated.

In some embodiments, participation in a jackpot may comprise one of three options as encapsulated by the following: (1) Players may elect to place a bet on the jackpot number and color. This option may lead to higher payouts. (2) Players may elect to place a bet on a specific number range 0-4 and 5-9 or odd/even numbers. (3) Players may elect to place a bet on the color black or red.

To provide a more complete understanding of the present invention and features and advantages thereof, reference is made to the following description, taken in conjunction with the accompanying figures, wherein like reference numerals represent like parts, in which:

At the upper right hand corner of FIG. 1 is a timer, here indicating 49 seconds, which may comprise the amount of time remaining in the betting session or roulette game. The time may indicate a time, such as how much time remains in a game or betting session. Above the timer are three tabs—Test (which allows the user to test the games compatibility with his/her computer), Tutorial (which described how to play the game), and Free Play (which allows the user to play the game for free).

In the middle of the Roulette wheel is a box which may depict, e.g., the relevant financial number (e.g., the currently winning number, or last significant digit of the relevant market. Here, this number inside the roulette wheel is the last digit of the index, which is constantly changing throughout the betting session.

Next to the roulette wheel is a gambling table with the colors red and black in boxes at the top, and the numbers 0 to 9 listed in its separate box in the middle. At the bottom are two boxes labeled 0-4 and 5-9. On the right hand side of the table are two arrows—one pointing to the odd numbers, one pointing to the even numbers.

In the upper right hand corner of the interface, an amount available to bet may be displayed (here, 10,000.00). Below the amount available to bet, a time display may display an amount of time. The amount of time may comprise the current time, an amount of time remaining in a betting session, an amount of time available to place bets during a betting session before betting closes, an amount of time a game has been played, an amount of time until the next game starts, or any other amount of time. On the bottom right hand corner, the odds (e.g., for a selected bet or bet type) and stakes (e.g., of a selected bet or bet type) may be displayed. A place bet tab may also be displayed. The amount a user can or would win or lose (or has won or lost) on a bet may be shown in 'profits' and 'losses'. The profits and losses field may display an amount that a user has gained (and/or lost) or could gain (or lose) in a current game, gaming session, day, week, period since last login, or other time period.

It should be appreciated that many of the features shown in FIG. 1 also appear in some or all of FIGS. 2-20. Accordingly, the description provided above for FIG. 1 may also in some embodiments apply equally to the similar features in FIGS. 2-20.

FIGS. 1-4 may indicate features associated with the same betting session, e.g., wherein the user bets on the number 8.

Figure 2:
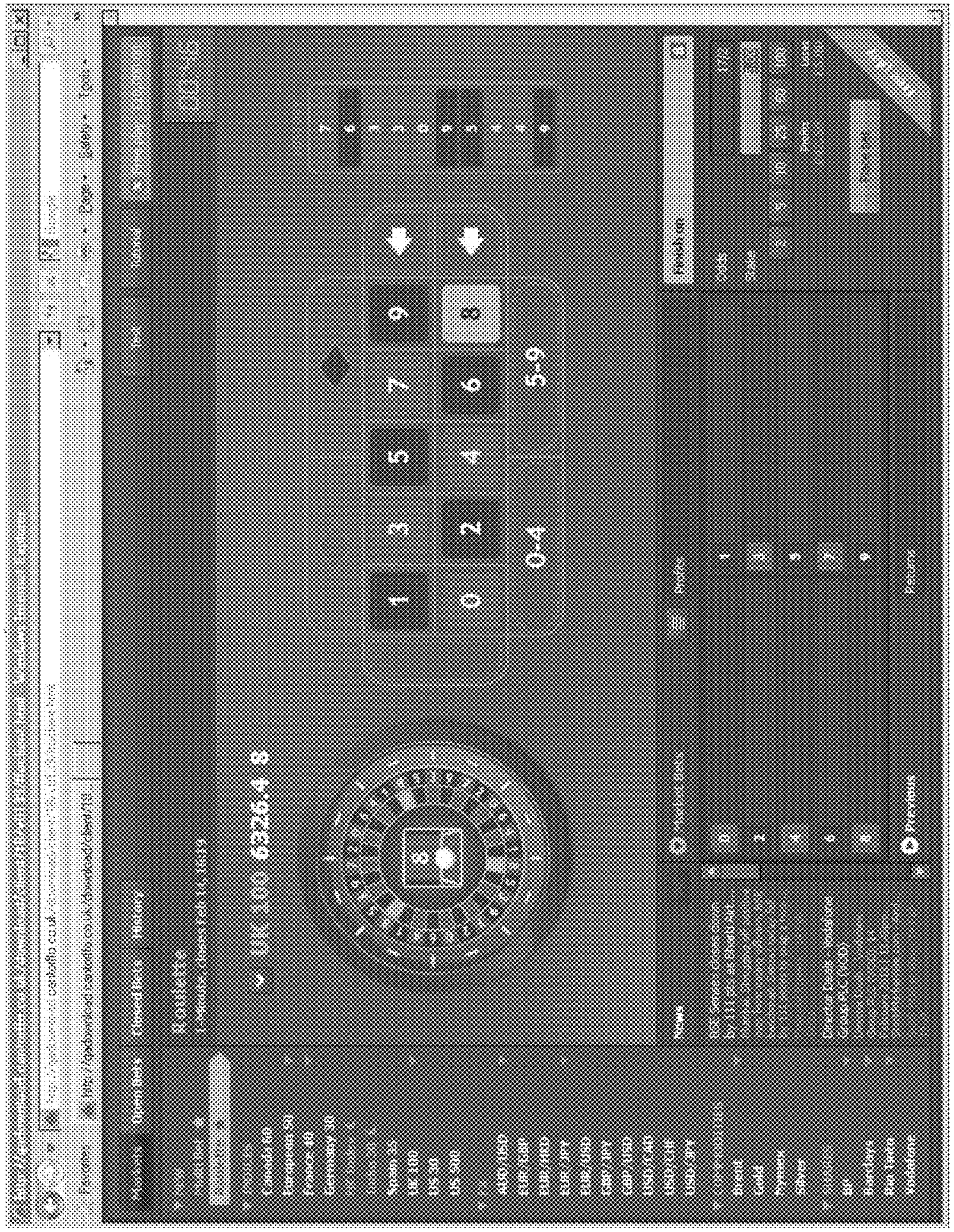
FIG. 2 depicts an exemplary user interface according to an embodiment.

FIG. 2 depicts an exemplary user interface according to an embodiment. The timer may show "46", indicating that there are 46 seconds remaining in the betting session or roulette game. For example, the interface of FIG. 2 may be displayed 3 seconds after the interface of FIG. 1. Various other FIGS. may display other times of the same gaming session.

The interface shows a sample bet, e.g., a bet made by a user. This bet may be made under the Free play setting of the game (free play tablet is red), or the bet may be made using real currency or value. The currently displayed winning number is shown to be 8 (though the game may not be finished yet, and the winning number may change).

Coincidentally, the number "8" may also be highlighted in yellow on the gaming table, indicated that "8" has been selected by the user, e.g., as a current bet selection. For example, the number 8 may be highlighted in yellow when the user clicks on the 8 icon on the gaming table, and/or when the user places or confirms a bet on the number 8. The bottom right hand corner of the interface shows that the odds of the bet winning are 17/2, and the stake is currently configured to be £5.00 (which is currently highlighted, indicating that the user may change the amount by entering a different number). The user is shown to have a possible £42.50 in gain/profit (e.g., if the bet wins) and £5.00 in losses (e.g., if the bet loses). (Notably, the odds (17/2) times the stake (£5.00) is equal to the amount that would be won (£42.50). In some embodiments, these amounts may represent the user's wins and losses (or expected or possible wins and losses) for a given betting session or time period such as a day or other time period.

On the screen, there is a roulette wheel that may comprise the numbers 0 to 9, e.g., and colors black and red (and optionally other colors such as yellow), an arrow pointing to the odd numbers, an arrow pointing to the even numbers, a field showing "0-4", and a field showing "5-9". Each of these indicia may be selectable for a bet, e.g., to bet on the number 4 winning or to bet on even, odd, red, black, 5-9, etc. These may be selectable betting indicia.

Figure 3:
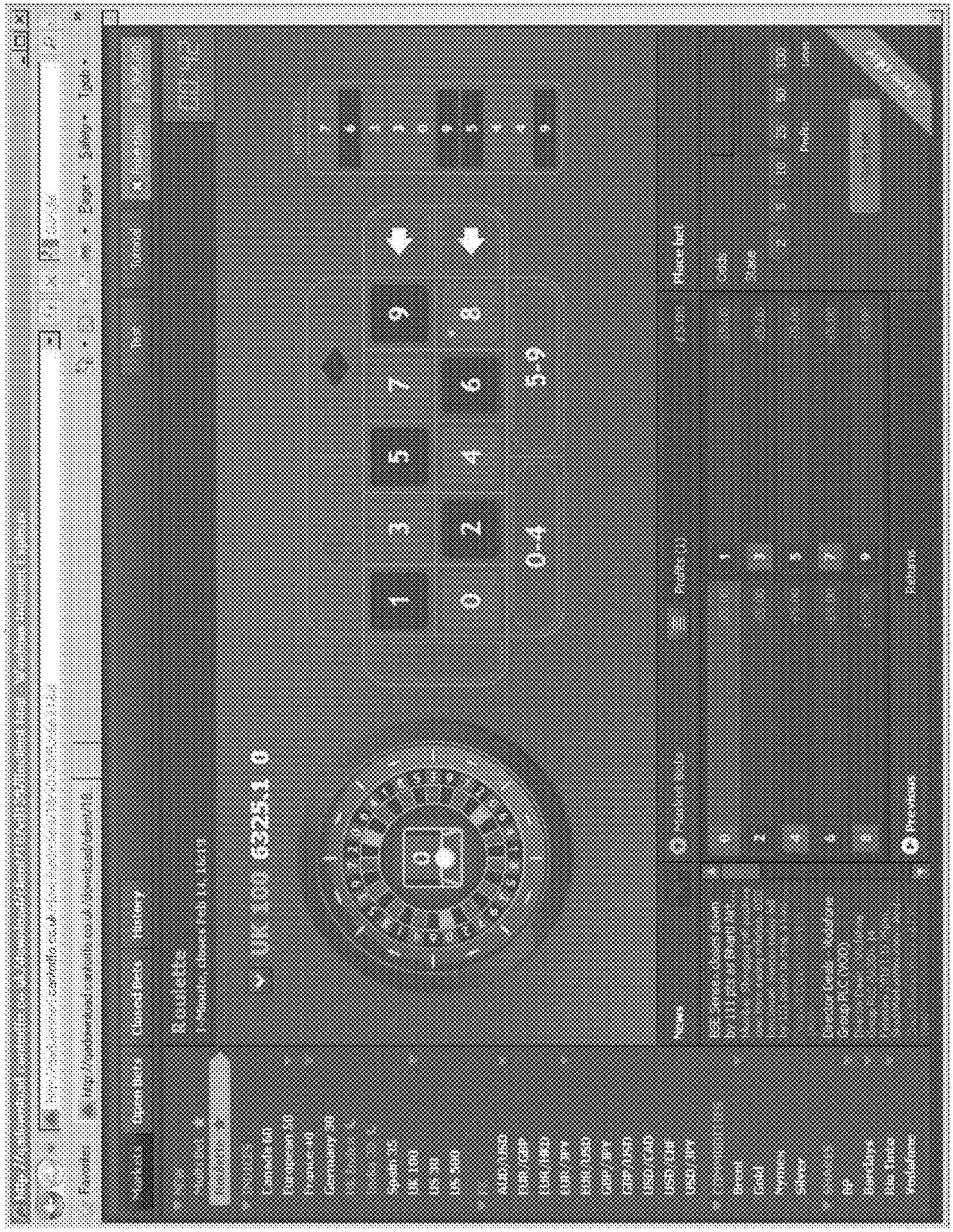
FIG. 3 depicts an exemplary screenshot of a user interface according to an embodiment.

FIG. 3 depicts an exemplary screenshot of a user interface according to an embodiment. In some embodiments, this screen may be shown after the user has submitted a wager of £5.00 on the number 8 (e.g., by pressing the "place bet" button), but before the game has been resolved, e.g., while there is still 42 seconds left in the betting session or game. The amount available to bet may be reduced by 5.00 because the user has placed a £5.00 wager, and the new amount available to bet may be 9,995.00.

The timer may indicate that there are 42 seconds remaining in the game or betting session. An indicator such as a small yellow dot (or other color or shape) in the upper left of the "8" field on the virtual game table may indicate that the user has placed a bet on the number 8. In some embodiments, the dot or other indicia may indicate or correspond to placing a chip or chips on a number in a real roulette game at a real roulette table. In some embodiments, the indicator may also display or indicate virtual chips or otherwise indicate the amount of the user's bet (e.g., two dots or a larger or darker dot represents a bet of 10, three dots and an even larger or darker dot represents a bet of 15, etc.). The currently winning number inside the roulette wheel is currently shown to be 0 (e.g., because the last significant digit of the UK 100 is currently 0).

In some embodiments, other users' bets may also be displayed on the table, e.g., in a different color, font, size, or style to indicate the other player who placed them (e.g., the color green corresponds to user 2, the color purple corresponds to user 3, etc.).

The Profits field (shown immediately to the right of the "Market Bets" heading) may show the gain/loss amount associated with the currently winning number in the Market Bets field (e.g., the amount the player would win or lose if the current number were the result of the game). Accordingly, the Profits field in FIG. 3 may show "−£5.00" to indicate that if "0" is the roulette result, the player will lose his 5.00 betting stake on the number "8". The highlighting color may be red to indicate that this amount represents a net loss to the player instead of a win/gain (which may be highlighted in a different color such as blue). Similarly, negative numbers like "−£5.00" may be colored red to indicate a negative/loss amount, and positive numbers (such as "42.50") may be colored blue to indicate a positive/win amount.

It should be appreciated that the value of the index (6325.10), the currently winning number/result (here, "0"), the amount in the Profits tab, and the row that is currently highlighted in the Market Bets section may all change dynamically in real time or substantially real time as the value of the index changes.

The user is shown to have £42.50 in possible profits or gains (in the "bet on 8" field) if the outcome is 8 wherein the bet on 8 would win. The number "0" and the associated £5.00 in potential losses is highlighted in red in the Market Bets field, and £5.00 is shown in the "Profits(1)" field, e.g., to indicate that this amount would be deducted from the user's account if the outcome is the number zero. (For example, the user would lose his £5.00 stake in the "bet on 8" if the number zero were the outcome.)

In some embodiments, the £42.50 indicated in the "bet on 8" field may represent an amount the user would win (e.g., for betting on 8 and/or for all of the user's bets in the game in total) if the outcome of the game is the number "8". The upper right hand corner timer shows that 49 seconds remain in the game or betting session. (Or in some embodiments, the time indicia shows that 49 second have lapsed since the game or betting session started.) Amounts of negative £5.00 are shown for each number other than 8, which may indicate that the user will lose this amount if the outcome is any number other than 8. In some embodiments, this may represent that the user will lose the user's stake in the bet on "8" (i.e., £5.00) if the outcome is any number other than 8.

Figure 4:
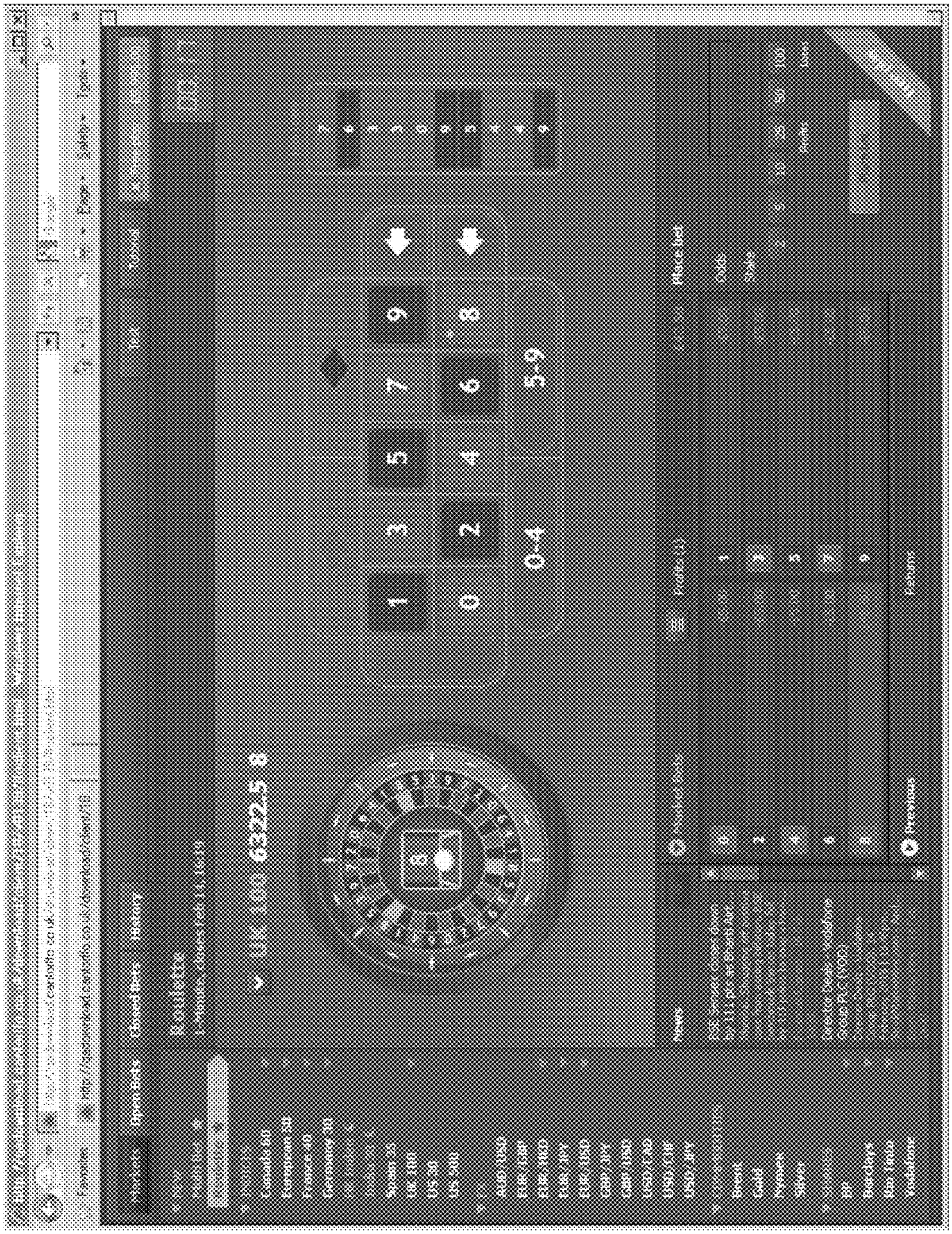
FIG. 4 depicts an exemplary user interface according to an embodiment according to an embodiment.

FIG. 4 depicts an exemplary user interface according to an embodiment according to an embodiment. This screenshot may appear when there are 17 seconds left in the game or betting session and the user has bet £5.00 on the number "8".

Here, the UK 100 index value is now 6322.58, wherein "8" is the currently winning number. The currently winning number inside the roulette wheel is displayed to be 8. Under the market bets tab in the middle, the "8" row is highlighted in blue, indicating the user would win £42.50 on his/her £5.00 bet if an 8 ends up being the outcome of the roulette game (that is, if an "8" is determined to be the last digit of the UK 100 value at the end time of the roulette game.

As the number 8 is the currently winning number, the number "8" and the associated £42.50 in potential profit may be highlighted in blue in the Market Bets field. An amount of £42.50 may be shown in the "Profits(1)" field, e.g., to indicate that this amount would be added to the user's account (e.g., in addition to or including the user's £5.00 stake) if the outcome of the roulette game is the number 8. The number eight and its row may in the Market Bets section be highlighted in blue to indicate that if an eight is the outcome, the user will win money.

Figure 5:
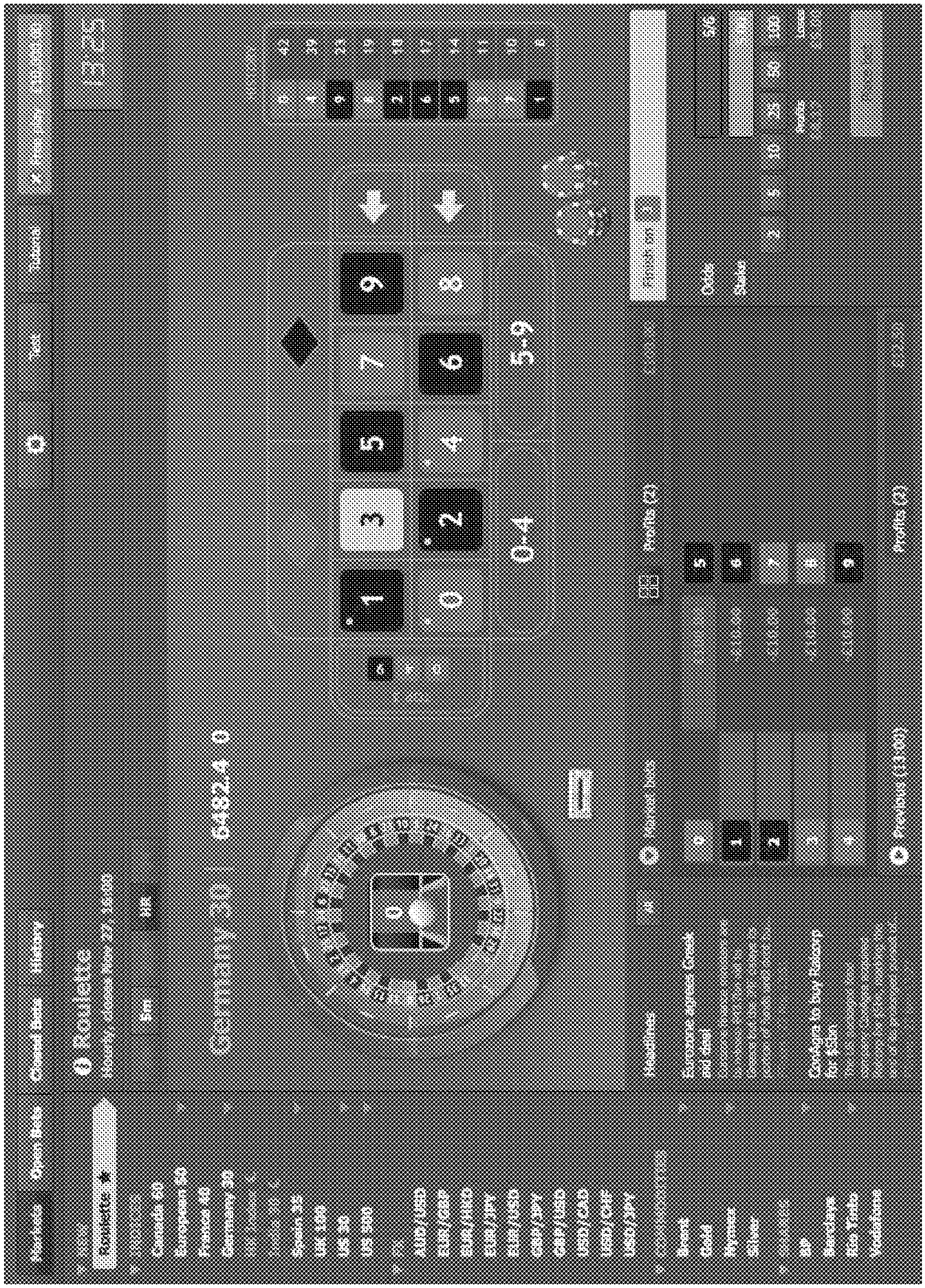
FIG. 5 depicts an exemplary user interface according to an embodiment according to an embodiment.

FIG. 5 depicts an exemplary user interface according to an embodiment according to an embodiment. This interface may be for display purposes only, as the bets indicated on the table may not properly correspond to other indicia such as the market bets area.

The four-box icon to the right of the Market Bets section may be selected to cause the interface to show all bets placed by the user during the current betting market (e.g., in the present game).

FIGS. 6-9 may correspond to the same betting session, e.g., wherein the user bets on the number 9.

Figure 6:
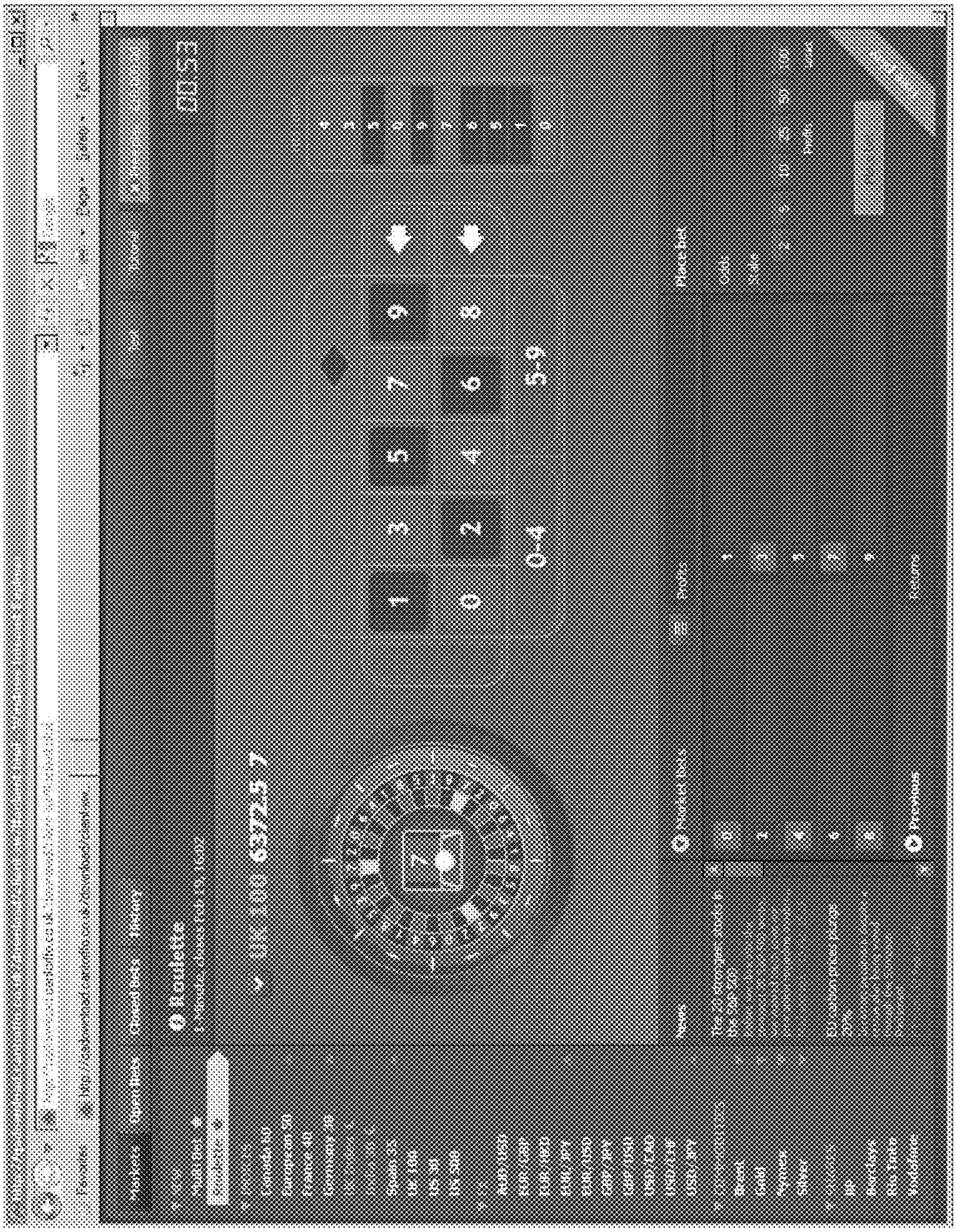
FIG. 6 depicts an exemplary user interface according to an embodiment according to an embodiment.

FIG. 6 depicts an exemplary user interface according to an embodiment according to an embodiment. The currently displayed value of the UK 100 is shown to be 6372.57, so 7 is highlighted in yellow inside the roulette wheel and displayed in the center of the roulette wheel. The user has not placed any bets.

Figure 7:
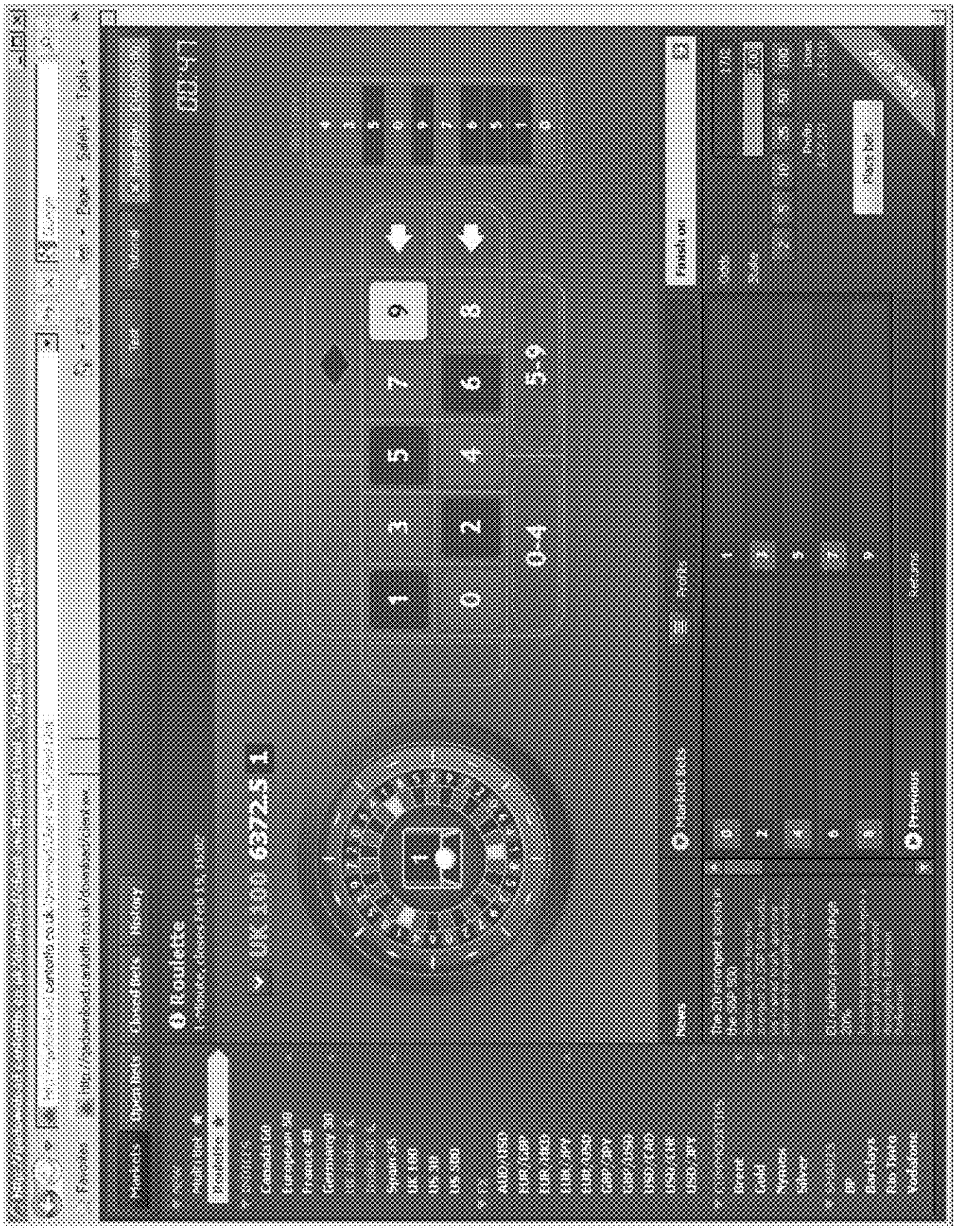
FIG. 7 depicts an exemplary user interface according to an embodiment according to an embodiment.

FIG. 7 depicts an exemplary user interface according to an embodiment. The user has selected the number 9, e.g., for a possible bet. This bet may be made under the Free play setting of the game (free play tablet is red), or the bet may be made using real currency or value. The currently displayed winning number is shown to be 9 (though the game may not be finished yet, and the winning number may change). The number "9" is highlighted in yellow on the gaming table, indicated that "9" has been selected by the user, e.g., as a current possible bet selection.

The bottom right hand corner of the interface shows that the odds of the bet winning are 17/2, and the stake is currently configured to be £5.00 (which is currently highlighted, indicating that the user may change the amount by entering a different number). The user is shown to have a possible £42.50 in gain/profit (e.g., if the bet wins) and £5.00 in losses (e.g., if the bet loses).

(Notably, the odds (17/2) times the stake (£5.00) is equal to the amount that would be won (£42.50). In some embodiments, these amounts may represent the user's wins and losses (or expected or possible wins and losses) for a given betting session or time period such as a day or other time period.

Figure 8:
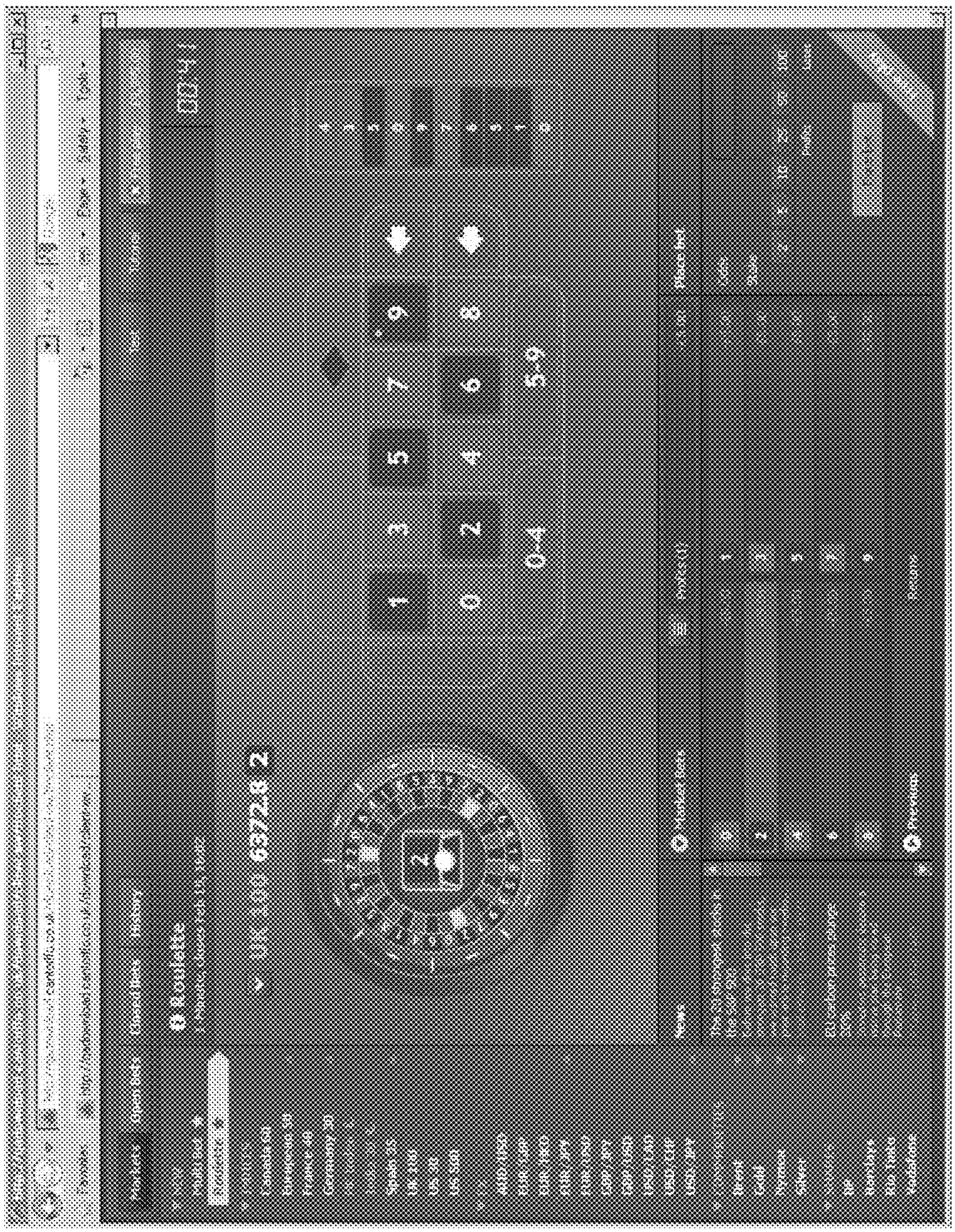
FIG. 8 depicts an exemplary user interface according to an embodiment according to an embodiment.

FIG. 8 depicts an exemplary screenshot of a user interface according to an embodiment. In some embodiments, this screen may be shown after the user has placed the bet on "9", which may be indicated by a yellow dot in the upper left of the number 9 on the gaming table. As the user has placed a £5.00 wager, the amount of £5.00 has been deducted from the amount available to wager, which is now £9,995.00. The timer may indicate that there are 41 seconds remaining in the game or betting session. The number in the winning number field is currently shown to be 2. As shown under the market bets tab in the middle, the user would lose the £5.00 stake on the bet for "9" if the result were "2". The user is shown to have £42.50 in possible profits or gains (in the "bet on 9" field) if the outcome is 9 wherein the bet on 9 would win. The number "0" and the associated £5.00 in potential losses is highlighted in red in the Market Bets field, and −£5.00 is shown in the "Profits(1)" field, e.g., to indicate that the amount that would be lost by the user and/or deducted from the user's account due to the losing bet.

In some embodiments, the £42.50 indicated in the "bet on 9" field may represent an amount the user would win (e.g., for betting on 9 and/or for all of the user's bets in the game in total) if the outcome of the game is the number "9". The upper right hand corner timer shows that 41 seconds remain in the game or betting session. (Or in some embodiments, the time indicia shows that 41 second have lapsed since the game or betting session started.) Amounts of negative £5.00 are shown for each number other than 9, which may indicate that the user will lose this amount if the outcome is any number other than 9. In some embodiments, this may represent that the user will lose the user's stake in the bet on "9" (i.e., £5.00) if the outcome is any number other than 9.

Figure 9:
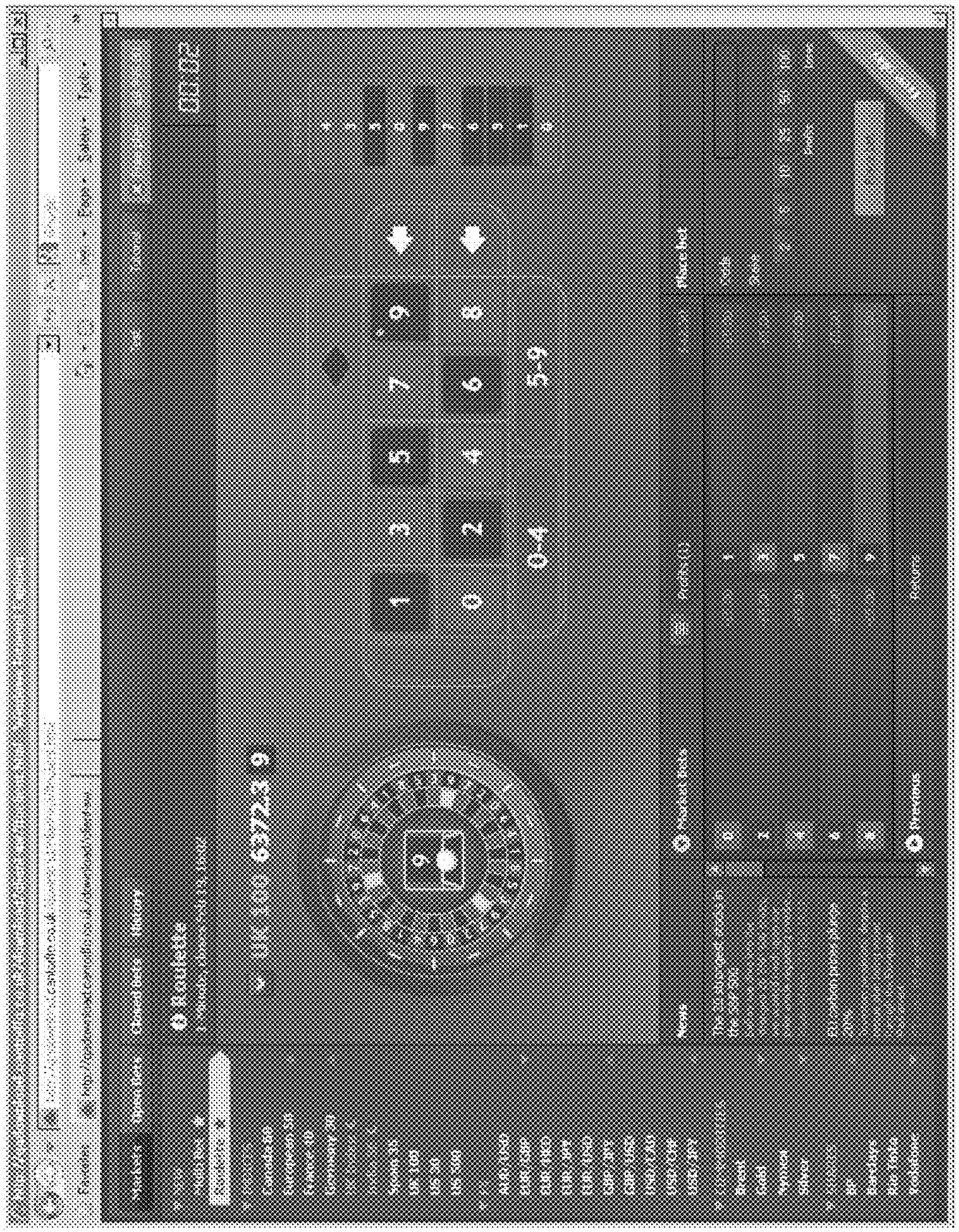
FIG. 9 depicts an exemplary user interface according to an embodiment according to an embodiment.

FIG. 9 depicts an exemplary screenshot of a user interface according to an embodiment. In some embodiments, this screen may be shown after the user has won a bet. Here, the timer may indicate that there are 2 seconds remaining in the game or betting session, e.g., indicating that 39 seconds have elapsed since the display of the image in FIG. 8. The number in the currently winning number field is currently shown to be 9. As shown under the market bets tab in the middle, the user would the £42.50 stake on the bet for "9" if the result were "9". The user is shown to have £42.50 in possible profits or gains (in the "bet on 9" field) if the outcome is 9 wherein the bet on 9 would win. The number "9" and the associated £42.50 in potential winnings is highlighted in blue in the Market Bets field, and £42.50 is shown in the "Profits(1)" field, e.g., to indicate that the amount that would be added to the user's account due to the winning bet.

Figure 10:
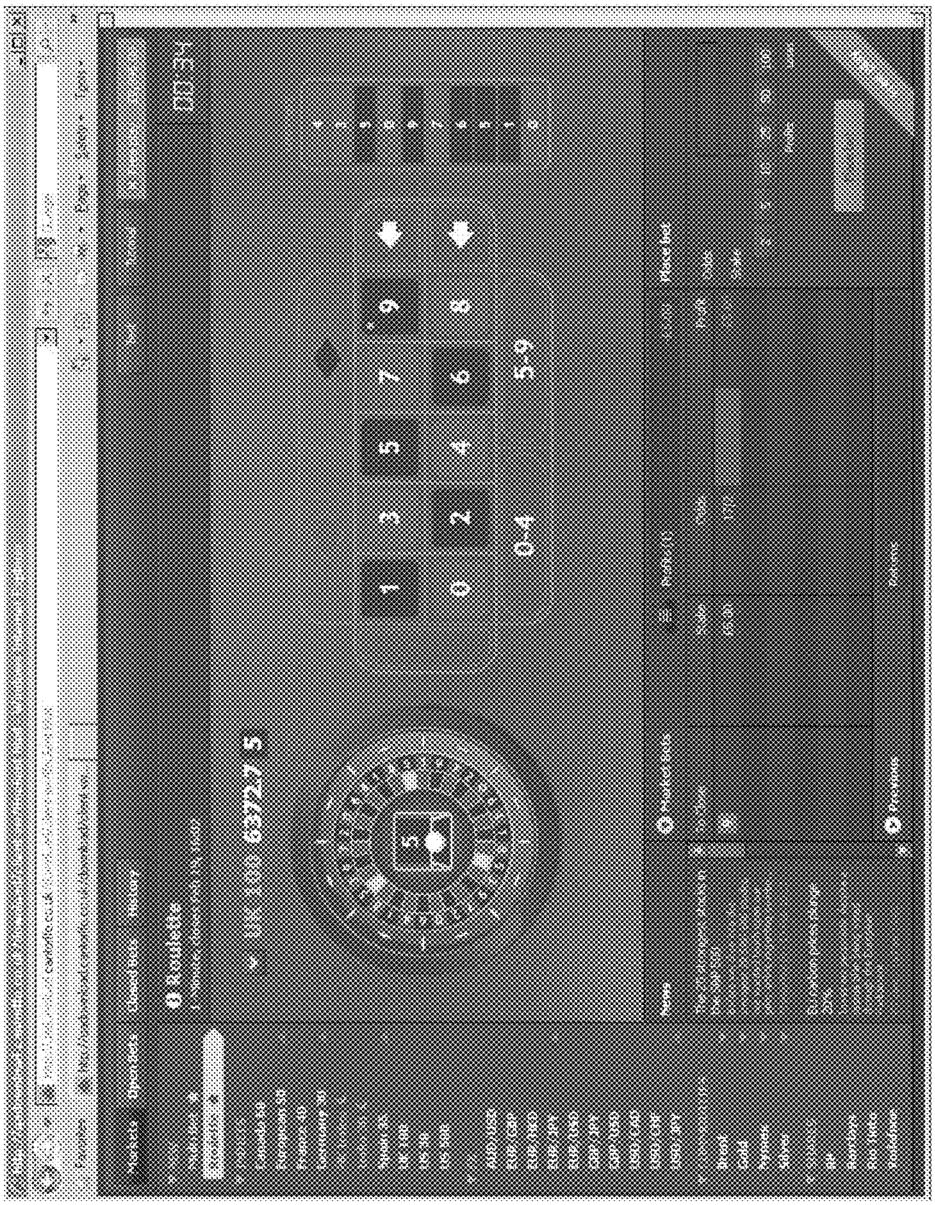
FIG. 10 depicts an exemplary user interface according to an embodiment according to an embodiment.

FIG. 10 depicts an exemplary screenshot of a user interface according to an embodiment. In some embodiments, this screen may present an alternate view of the Market Bets. For example, it may show each number bet on, the stake of such bet, odds for such bet, and profit/loss (e.g., according to the result that would occur if the currently winning number were the result of the game). Here, it shows one bet on 9 with a stake of 5, odds of 17/2, and a profit of −£5.00 highlighted in red (e.g., because the currently winning number is 5, which would result in a loss for the user).

Figure 11:
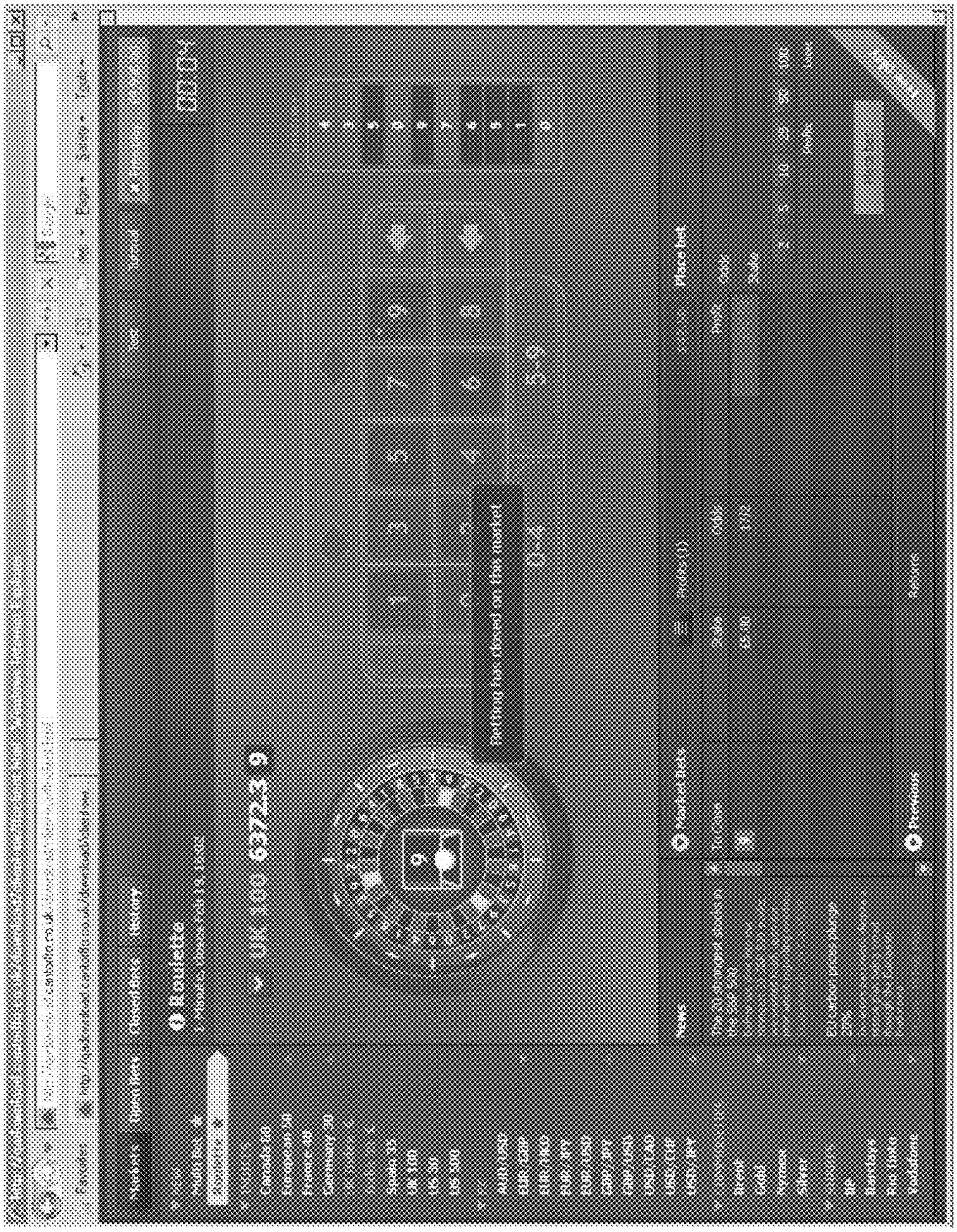
FIG. 11 depicts an exemplary user interface according to an embodiment according to an embodiment.

FIG. 11 depicts an exemplary screenshot of a user interface according to an embodiment. In some embodiments, this screen may be shown as a summary of the user's wagers/bets. Here, the timer may indicate that there are 4 seconds remaining in the game. A message indicating that betting has closed on this market may be displayed, indicating that no further bets may be made by any player.

In the first wager/bet, the number in the winning number field is currently shown to be 9. As shown under the market bets tab in the middle, the user placed a £5.00 stake on the bet for "9" with the odds being 17/2. Since the currently winning number is 9, the associated winnings of £42.50 is highlighted in blue in the Market Bets field under the "Profits(1)" field, e.g., to indicate that the associated winnings of £42.50 would be added to the user's account if the result were a 9.

Figure 12:
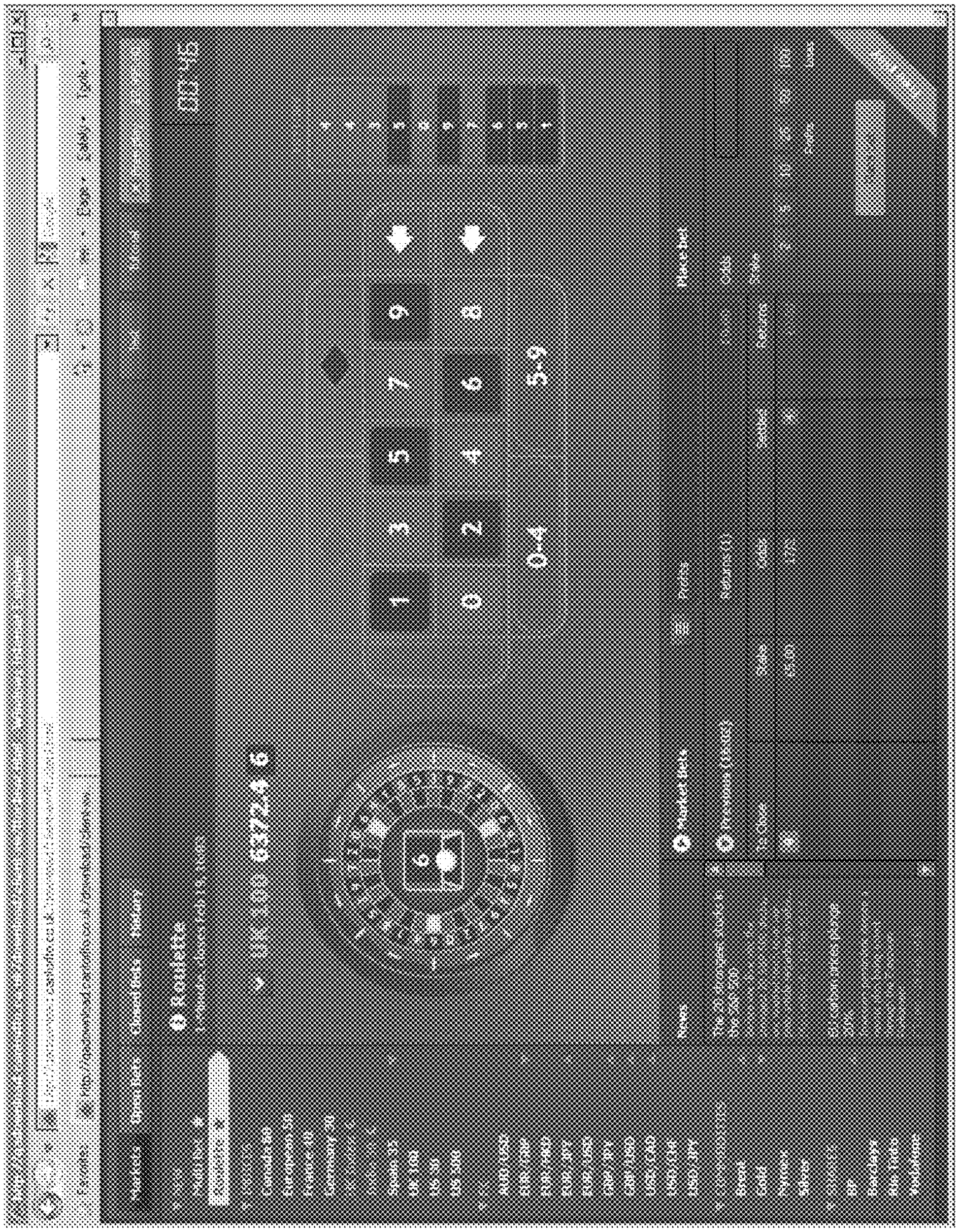
FIG. 12 depicts an exemplary user interface according to an embodiment according to an embodiment.

FIG. 12 depicts an exemplary screenshot of a user interface according to an embodiment. A "Previous" icon under Market Bets may be highlighted to indicate information about a prior betting session (e.g., the session depicted in FIGS. 6-9). Next to the word "Previous", a prior betting session expiry time may be indicated. Information about a prior session may be indicated in response to the user selecting the "Previous" tab, for example. Here, "16:02" may indicate that the last betting session in which the user participated ended at 16:02 (i.e., 4:02 p.m.). The selected number for the prior bet ("To Close"), stake, odds, settled number (actual game outcome), and returns may be shown. Here, in the prior betting session, the user bet on the number "9", with a stake of £5.00, odds of 17/2, and the actual game result was 4, indicating that the user lost the bet. The returns was zero, indicating that the user lost the bet and did not receive anything from the betting system. The user lost his betting stake of £5.00.

Figure 13:
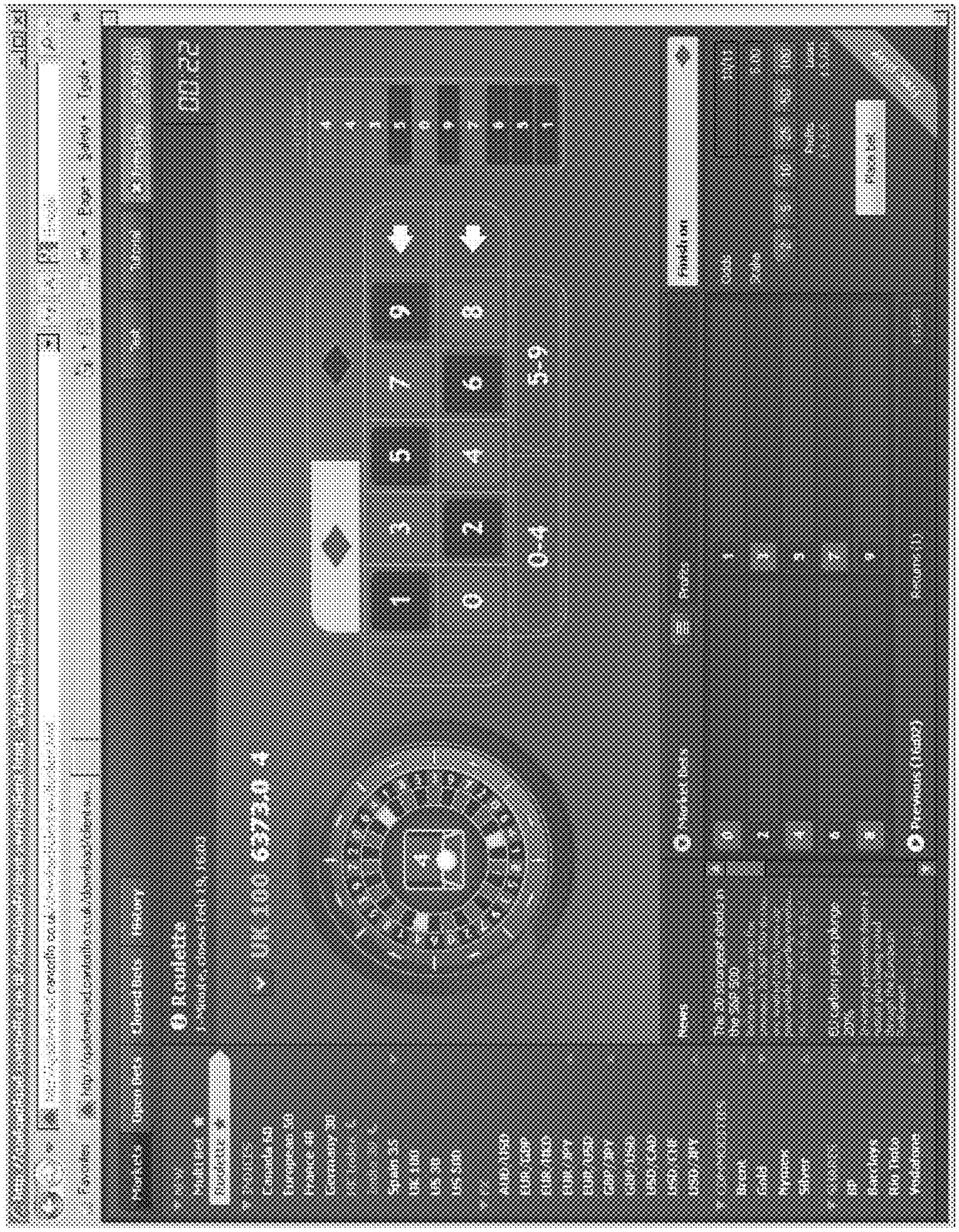
FIG. 13 depicts an exemplary user interface according to an embodiment according to an embodiment.

FIG. 13 depicts an exemplary screenshot of a user interface according to an embodiment. In some embodiments, this screen may be shown while the user is selecting a wager of £5.00 on the color red, but before (or after) the bet has been submitted or the game has been resolved. Here, the timer may indicate that there are 22 seconds remaining in the game or betting session. The currently displayed winning number is shown to be 4 (though the game may not be finished yet, and the winning number may change). A red diamond is highlighted in yellow on the gaming table, which indicates that "red" has been selected by the user, e.g., as a current bet selection. The bottom right hand corner of the interface shows that the odds of the bet winning are 10/11, and the stake is currently configured to be £5.00. The user is shown to have a possible £4.55 in gain/profit (e.g., if the outcome is a red number and the bet wins) and £5.00 in losses (e.g., if the outcome is not a red number and the bet loses).

As £5.00 is (or may be) wagered by the user, the amount available to wager has been subtracted by £5.00 to £9,990.00.

Figure 14:
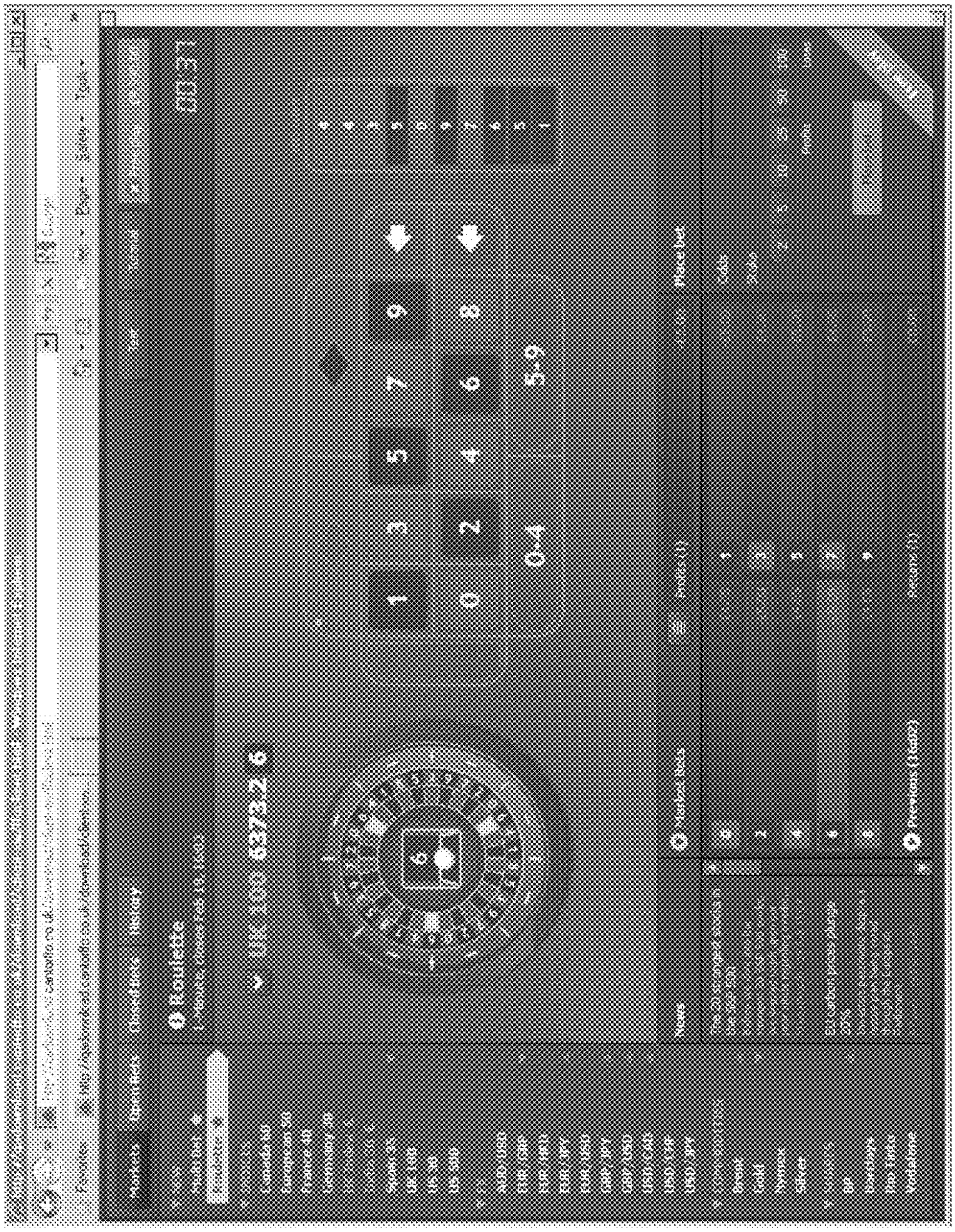
FIG. 14 depicts an exemplary user interface according to an embodiment according to an embodiment.

FIG. 14 depicts an exemplary screenshot of a user interface according to an embodiment. In some embodiments, this screen may be shown after the user has placed a bet on the color red (indicated by a yellow dot in the upper left of the "red" bet selection field). Here, the timer may indicate that there are 37 seconds remaining in the game or betting session. The number in the winning number field is currently shown to be 6, which is a "black" number (and would thus cause the "red" bet to lose). As shown under the market bets tab in the middle, the user would lose the £5.00 stake on the bet for the color red since the result is a black 6. The user is shown to have £4.55 in possible profits or gains (in the all red numbers fields) if the outcome is a number associated with the color red (such as 0, 3, 4, 7, and 8) wherein the bet on the color red would win. A loss of £5.00 is shown for all the black numbers. The number black 6 and the associated £5.00 in potential losses is highlighted in red in the Market Bets field, and −£5.00 is shown in the "Profits(1)" field, e.g., to indicate that the amount that has been deducted from the user's account due to the losing bet.

Figure 15:
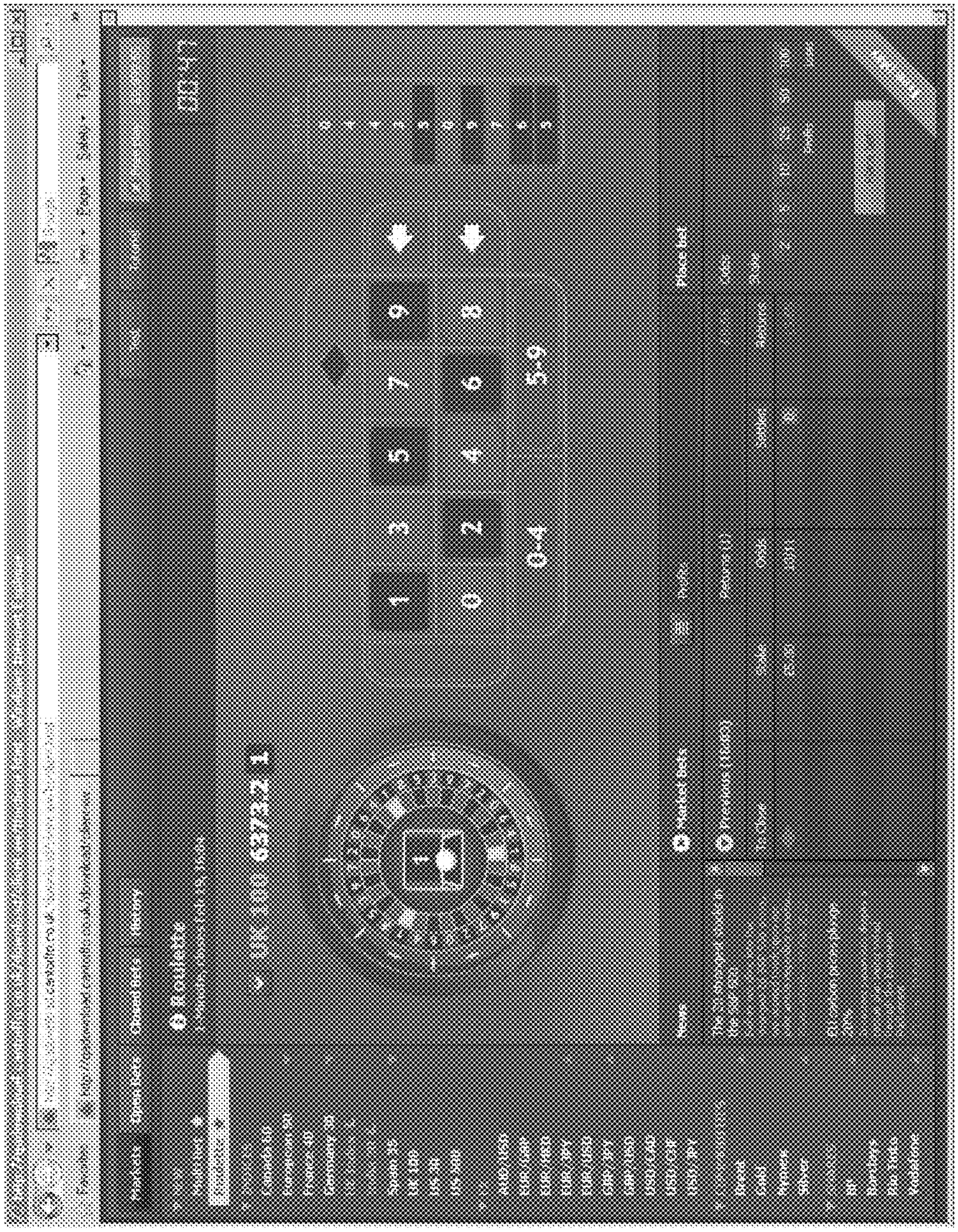
FIG. 15 depicts an exemplary user interface according to an embodiment according to an embodiment.

FIG. 15 depicts an exemplary screenshot of a user interface according to an embodiment. A "Previous" icon under Market Bets may be highlighted to indicate information about a prior betting session (e.g., the session depicted in FIGS. 12-14). Next to the word "Previous", a prior betting session expiry time may be indicated. Here, "16:03" may indicate that the last betting session in which the user participated ended at 16:03 (i.e., 4:03 p.m.). The selected number for the prior bet ("To Close"), stake, odds, settled number (actual game outcome), and returns may be shown. Here, in the prior betting session, the user bet on "red", with a stake of £5.00, odds of 10/11, and the actual game result was red 0, indicating that the user won the bet. The return was £9.55, e.g., indicating that the user received winnings of £4.55 plus the return of the user's betting stake of £5.00. The amount available to wager is therefore increased by £9.55 to £9,999.55.

Figure 16:
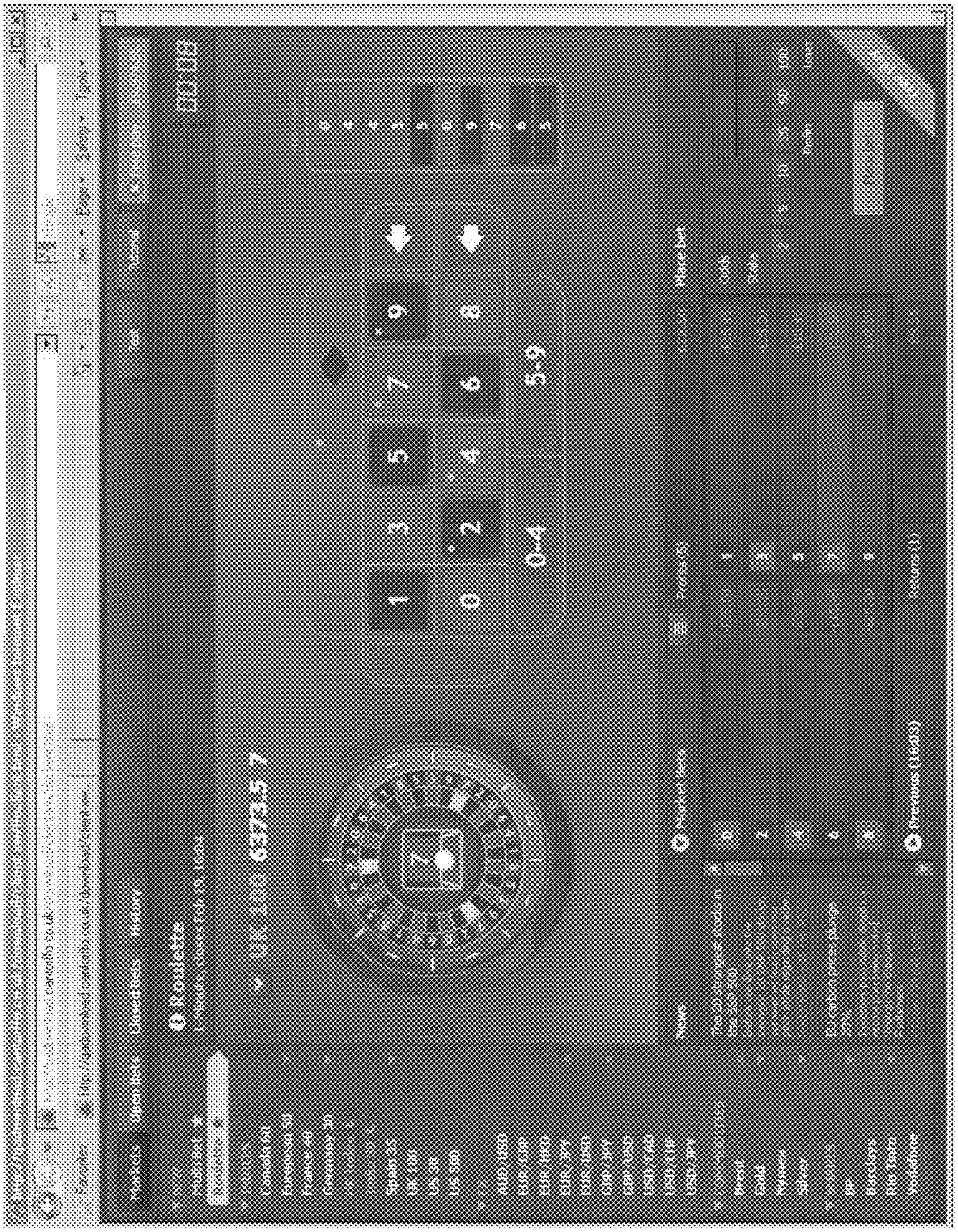
FIG. 16 depicts an exemplary user interface according to an embodiment according to an embodiment.

FIG. 16 depicts an exemplary screenshot of a user interface according to an embodiment. In some embodiments, this screen may be shown after the user has submitted a wager the color black and the numbers 2, 4, 7, and 9 (indicated by the yellow "dots/chips" in the upper left of their respective betting fields), but before the game has been resolved. Here, the timer may indicate that there are 8 seconds remaining in the game or betting session. The currently displayed winning number is shown to be 7, and the 7 field is highlighted in blue in the Market Bets field (indicating a win), with a profit of £22.50 (if 7 is the result). The user is shown to have a possible £22.50 in gain/profit (if the 4 or 7 bet wins), £32.05 in gain/profit (if the 2 or 9 bet wins), £15.45 in losses (if a 1, 5, or 6 is the result), or £25.00 in losses (if a 0, 3, or 8 is the result). In some embodiments, these amounts may represent the user's wins and losses (or expected or possible wins and losses) for a given betting session or time period such as a day or other time period.

In the Previous row, a return of £9.55 is shown as the result of the prior betting session that concluded on 16:03.

Figure 17:
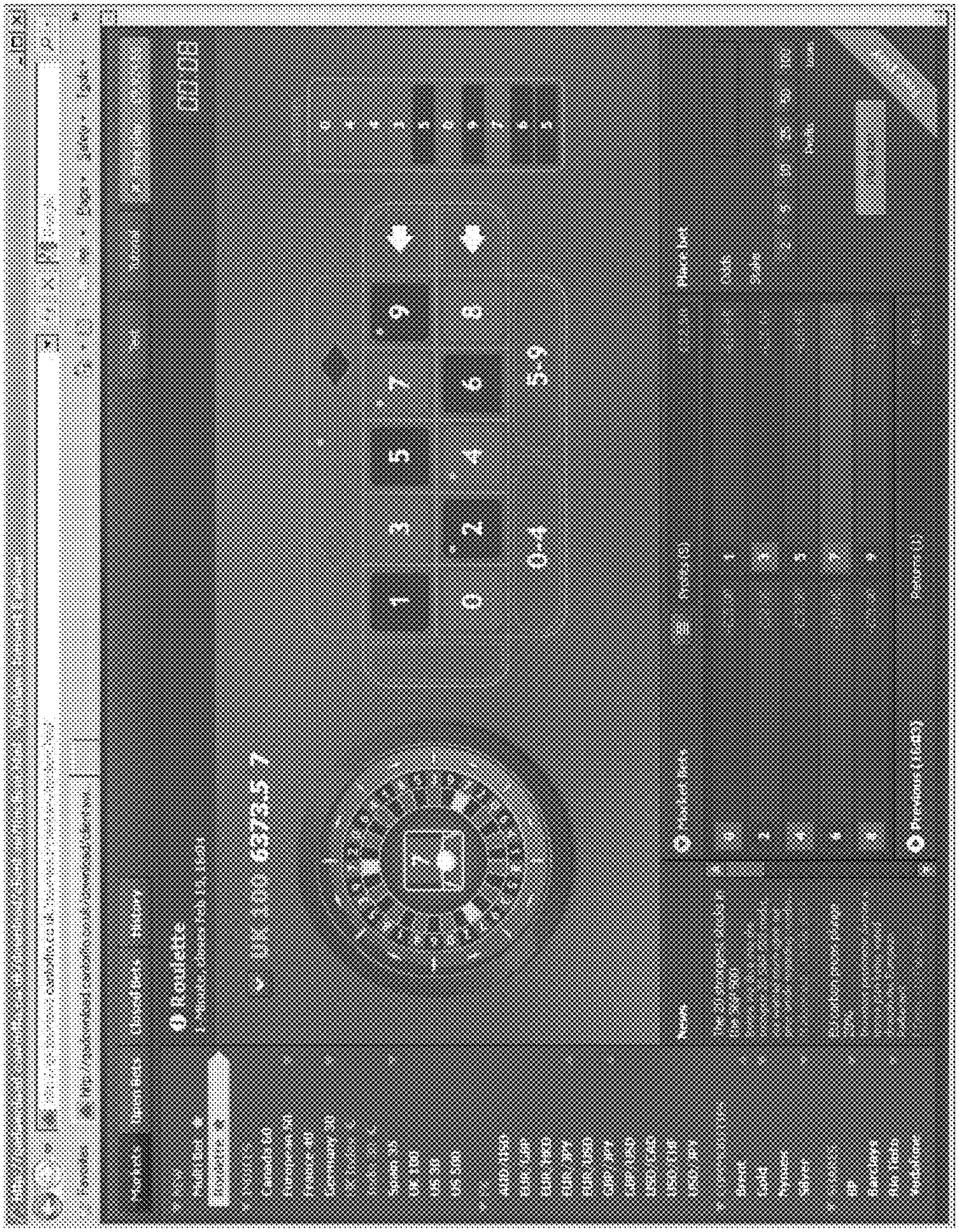
FIG. 17 depicts an exemplary user interface according to an embodiment according to an embodiment.

FIG. 17 depicts an exemplary screenshot of a user interface according to an embodiment. Here, the user may select the "Closed Bets" tab in the upper left to see a detailed view of the Closed Bets, shown in FIG. 18. Alternately, the user may click on "Open Bets" to see information about current open bets or "History" to see further information about prior betting sessions and results.

Figure 18:
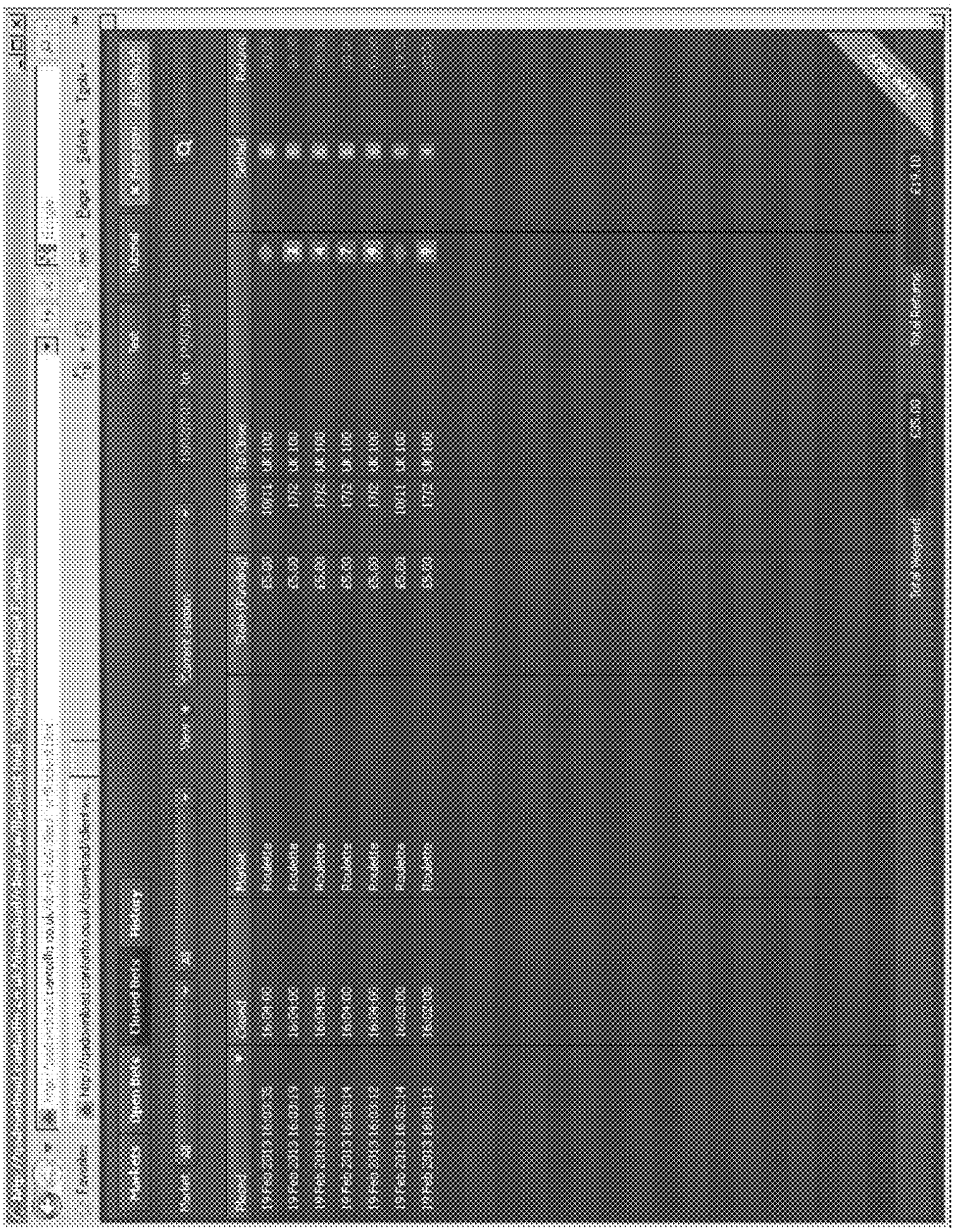
FIG. 18 depicts an exemplary user interface according to an embodiment according to an embodiment.

FIG. 18 depicts an exemplary user interface according to an embodiment. In some embodiments, this screen may be shown to summarize all of the user's bets (e.g., in one or more prior and/or current betting sessions) that have been settled or closed. On the top left hand corner of the screen, there are three tabs—markets, open bets, closed bets, and history. The closed bets tab is highlighted because it is the screen currently shown. Below these tabs is the market, view, and dates tabs. In this screen, all markets, and the current section on Feb. 19, 2013 is depicted. Below this tab is the summary which shows the date and time the bets were placed followed by the time they were closed. Next is a column for the market, follow by a column for the stakes. Then the "Odds" column, the "to close" column, the "settled" column, and the "returns" column are shown. At the bottom of the screen is a summary of the total amount wagered and the total returns. As shown in the "To Close," column, the user bet on 9 in the game session ending 16:02, the user bet on red in the session ending 16:03, and bet on 9, 7, 4, 2, and black in the session ending 16:04. The red bet won because the game settled on red 0, and yielded a return for that game of £9.55. Also, the bets in the 16:04 session settled on 6, resulting in a loss (zero return) for all of the bets except for black, which yielded a return of £9.55.

In this screen, it is shown that the user has placed a total of 7 bets. At the bottom, summary information shows a total amount of £35.00 wagered and a total return of £19.10. Accordingly, the amount returned less the amount wagered is a net expenditure of £15.90 for user. (Hence, the amount currently available to wager is £9,984.10, which is the beginning amount of £10,000.00 minus the net loss of £15.90 (i.e., £10,000.00 minus the amounts wagered and plus the amounts returned).)

Figure 19:
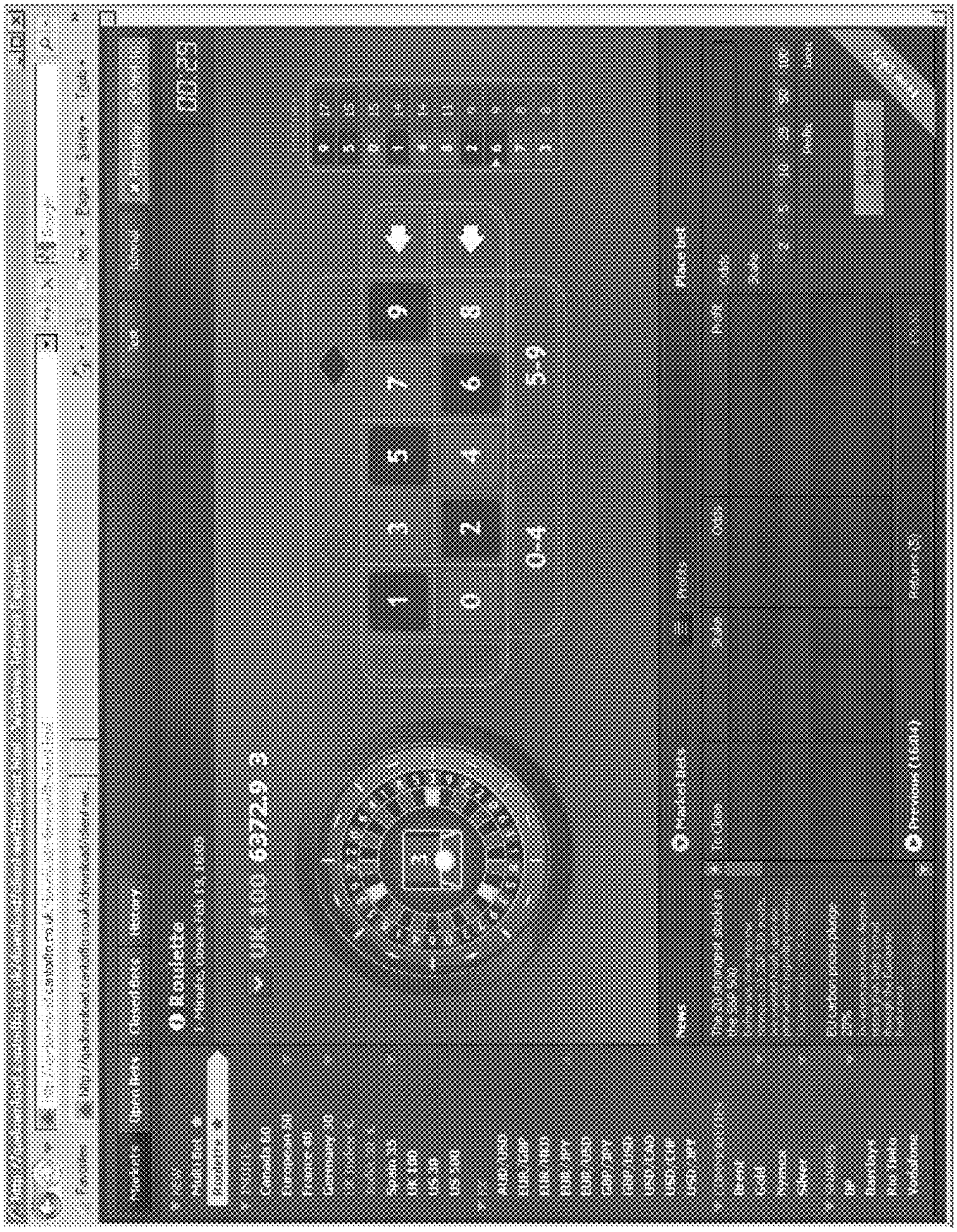
FIG. 19 depicts an exemplary user interface according to an embodiment according to an embodiment.

FIG. 19 depicts an exemplary screenshot of a user interface according to an embodiment. In some embodiments, this screen may be an alternate history view of one or more bets made by the user. As shown in the "Previous" row at the bottom of market bets tab in the middle, the return on the user's five bets in the prior 16:04 betting session were £9.55. A yellow arrow in the history view may indicate the game result corresponding to the game session indicated in the "Previous" tab, wherein the result of the game was black 6. The history tab on the right of the game table may display the various numerical outcomes (0-9) in order of the frequency of occurrence in a set of prior games (e.g., prior games during that day, hour, afternoon, week, year, etc.). Here, the history tab shows that the number 9 was the result in 17 prior games of a prior game set, and the number 3 was the result in 8 games.

Figure 20:
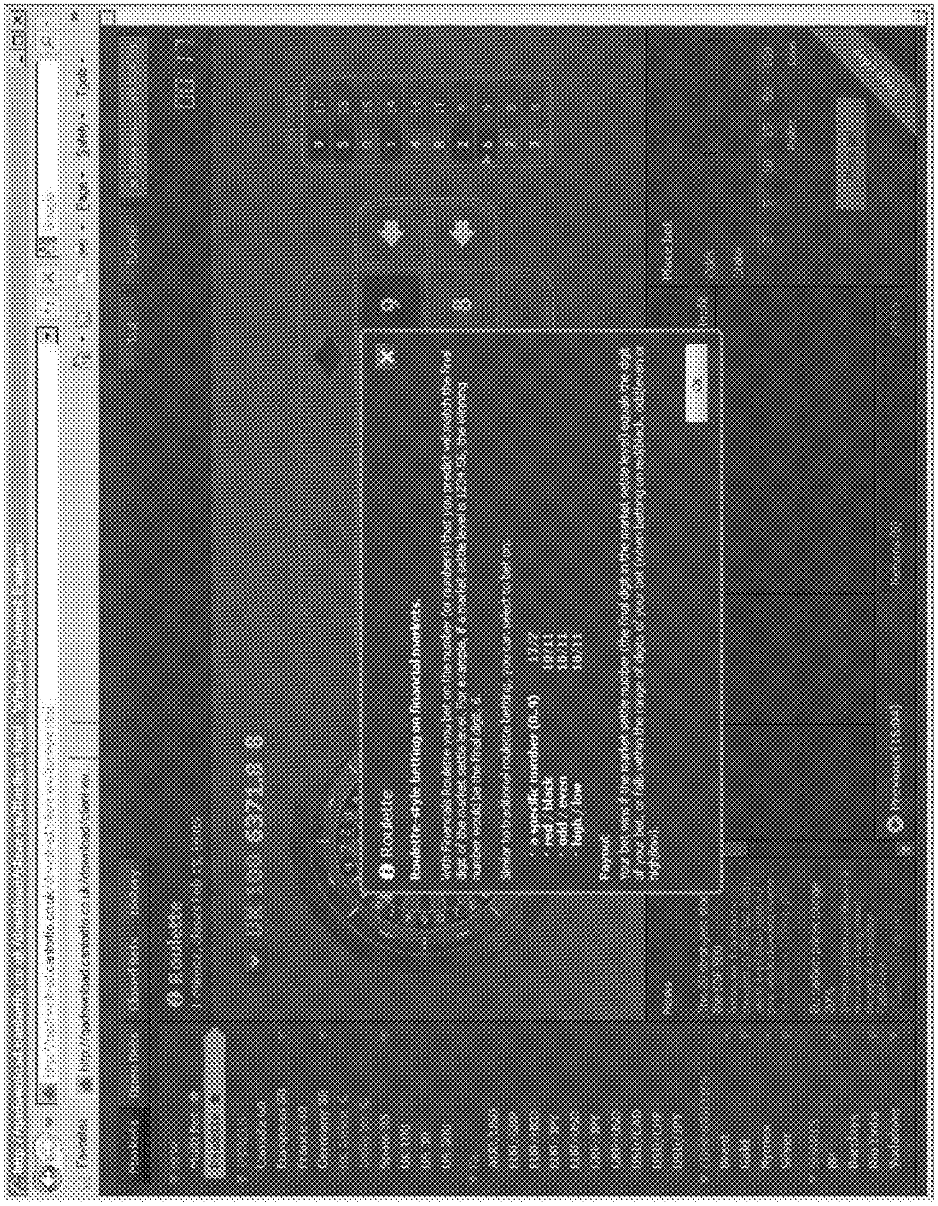
FIG. 20 depicts an exemplary user interface according to an embodiment according to an embodiment.

FIG. 20 depicts an exemplary screenshot of a user interface according to an embodiment. In some embodiments, this screen may be a possible pop-up screen that provides the user with information regarding a selected game. Here, the screen shows information about how to play the roulette game. As shown in FIG. 20, in some embodiments, the interface may explain the following for some embodiments of a roulette style game:

Roulette-style betting on financial markets. With Financial Roulette you bet on the number (or numbers) that you predict will match the final digit of the market settle level. For example, if a market settle level is 1234.56, the winning number would be the final digit, 6.

Similar to traditional roulette betting, you can select to be on:

a specific number (0 . . . 9) at 17/2 odds
red or black at 10/11 odds
odd or even at 10/11 odds
high or low at 10/11 odds Payout. Your bet wins if the market settle number (the final digit in the market settle level) equals the digit of your bet, or falls within the range of digits of your bet (when betting on red/black, odd/even, or high/low).

A roulette game may comprise an indicia of a ball, 10 numbers, and 3 colors, in which a number and a color are identified by where the ball comes to rest. In some embodiments, users may bet on one or more of a) a specific number from 0 to 9, b) red or black (or yellow), c) odd or even, or d) high or low. In some embodiments, each number 0-10 may be associated with either red or black. In one embodiment, the numbers 0, 3, 4, 7, and 8 may be associated with red, and the numbers 1, 2, 5, 6, and 9 may be associated with black. Accordingly, an outcome of a game may comprise "red 3" or "black 9," for example.

Figure 21:
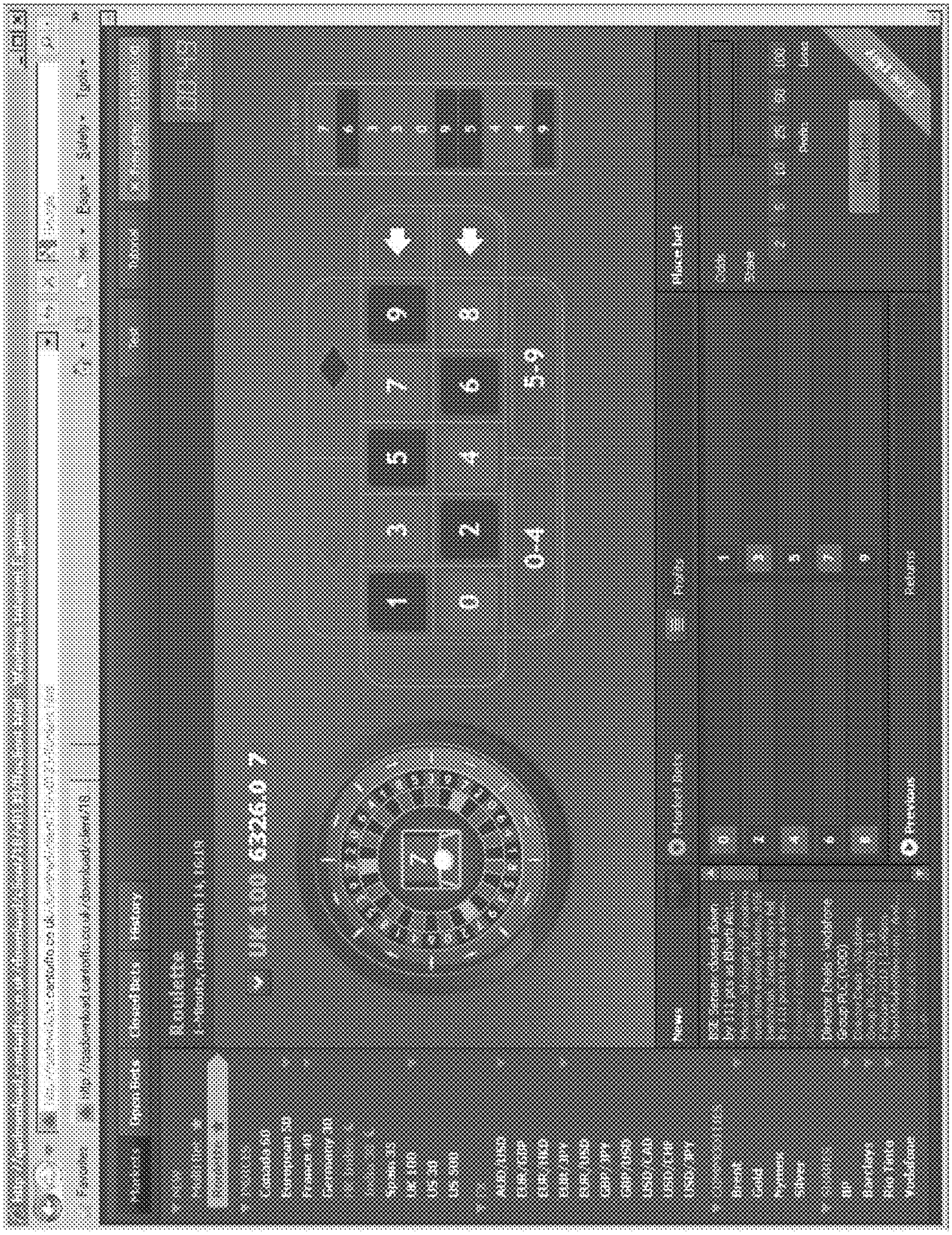
FIG. 21 depicts an exemplary screenshot of an exemplary user interface according to an embodiment.

An exemplary game interface is depicted in FIG. 21. The game interface may be displayed at a user interface, such as a user computing device such as a touch-screen, phone, computer, or other device comprising a visual display. It should be appreciated that one, some, all, or any number of the various elements described below may be shown in a user interface in any suitable arrangement. User may select various elements, e.g., via mouse or touch-screen, to request betting information, place bets, clear a prior selection, change a stake, or perform any other gaming-related action.

On the screen, there is a roulette wheel with the numbers 0 to 9 and colors black, red, and yellow. Next to the roulette wheel is a gambling table with the colors red and black listed on top, and the numbers 0 to 9 listed in its separate box in the middle. At the bottom are two boxes labeled 0-4 and 5-9. On the right hand side of the table are two arrows—one pointing to the odd numbers, one pointing to the even numbers.

On the upper right hand corner, a time display may display an amount of time. The amount of time may comprise the current time, an amount of time remaining in a betting session, an amount of time available to place bets during a betting session before betting closes, an amount of time a game has been played, an amount of time until the next game starts, or any other amount of time.

On the bottom right hand corner, the odds (e.g., for a selected bet or bet type) and stakes (e.g., of a selected bet or bet type) may be displayed. A place bet tab may also be displayed. The amount a user can win or lose on a bet may be shown in 'profits' and 'losses'. The profits and losses field may display an amount that a user has gained (and/or lost) or could gain (or lose) in a current game, gaming session, day, week, period since last login, or other time period.

In some embodiments, the various values displayed may change right up until the moment the user clicks 'Place bet'. In the bottom middle of the screen is the Market Bets tab. In this tab, the user can track his/her bets and the profit and losses of each bet. The user can close his/her bets by clicking 'close' or 'close all.' However, in some embodiments, closing a bet with a negative profit will result in less than the original stake being returned.

On the upper right hand corner of the screen, above the timer, Test, Tutorial, and Free Play tabs may be displayed. The Test tab may allow the user to see if the game is compatible with their computer. The Tutorial tab may offer a guide on how to play the game. The Free Play tab may offer the user an opportunity to play the game without any monetary considerations, e.g., using fake money or gaming credit at no cost to the player.

On the bottom left hand side or the screen, next to the Market Bets tab, a running ticker may display pertinent current events/news of the day. On top of the Roulette wheel on the screen is the market settle level of the country in question. The user may click on the down arrow and choose the various markets to bet on worldwide. In one embodiment of the invention, the countries listed include the US, Japan, and the UK. In some embodiments, the player may select a country, currency, financial index or market, or other parameter of the game. For example, a user may select "US" and "S&P 500", or may select "UK" and "FTSE 100", for example.

In one embodiment, a user bet may comprise a prediction of the final digit of the market settle level at a specific time (e.g., the end of the game). The bet may win if the market settle number (the final digit in the market settle level) equals the digit of the user's bet (or bet type, such as "even"), or comprises one of the digits or colors of a user's bet (e.g., when betting on red/black, odd/even, or high/low).

In some embodiments, games and associated betting sessions may start after (e.g., immediately after, or several seconds or minutes after) a prior one finishes. For example, a bet may start and/or stop every minute, for example. In some embodiments, a game may last one minute. During the first 50 seconds, players may join the game, configure settings, and configure and place bets. Betting may be closed at the end of 50 seconds. The game may conclude, and bets may be resolved and paid, at the end of 60 seconds. Other times and timings may be contemplated.

In some embodiments, participation in a jackpot may comprise one of three options as encapsulated by the following: (1) Players may elect to place a bet on the jackpot number and color. This option may lead to higher payouts. (2) Players may elect to place a bet on a specific number range 0-4 and 5-9 or odd/even numbers. (3) Players may elect to place a bet on the color black or red.

To provide a more complete understanding of the present invention and features and advantages thereof, reference is made to the following description, taken in conjunction with the accompanying figures, wherein like reference numerals represent like parts, in which:

FIG. 21 depicts an exemplary screenshot of an exemplary user interface according to an embodiment. At the upper right hand corner is a timer. The time may indicate a time, such as how much time remains in a game or betting session. Above the timer are three tabs—Test (which allows the user to test the games compatibility with his/her computer), Tutorial (which described how to play the game), and Free Play (which allows the user to play the game for free). On the screen, there is a roulette wheel with the numbers 0 to 9 and colors black, red, and yellow. Next to the roulette wheel is a gambling table with the colors red and black listed on top, and the numbers 0 to 9 listed in its separate box in the middle. At the bottom are two boxes labeled 0-4 and 5-9. On the right hand side of the table are two arrows—one pointing to the odd numbers, one pointing to the even numbers.

On the upper right hand corner, a time display may display an amount of time. The amount of time may comprise the current time, an amount of time remaining in a betting session, an amount of time available to place bets during a betting session before betting closes, an amount of time a game has been played, an amount of time until the next game starts, or any other amount of time. On the bottom right hand corner, the odds (e.g., for a selected bet or bet type) and stakes (e.g., of a selected bet or bet type) may be displayed. A place bet tab may also be displayed. The amount a user can win or lose (or has won or lost) on a bet may be shown in 'profits' and 'losses'. The profits and losses field may display an amount that a user has gained (and/or lost) or could gain (or lose) in a current game, gaming session, day, week, period since last login, or other time period.

Figure 22:
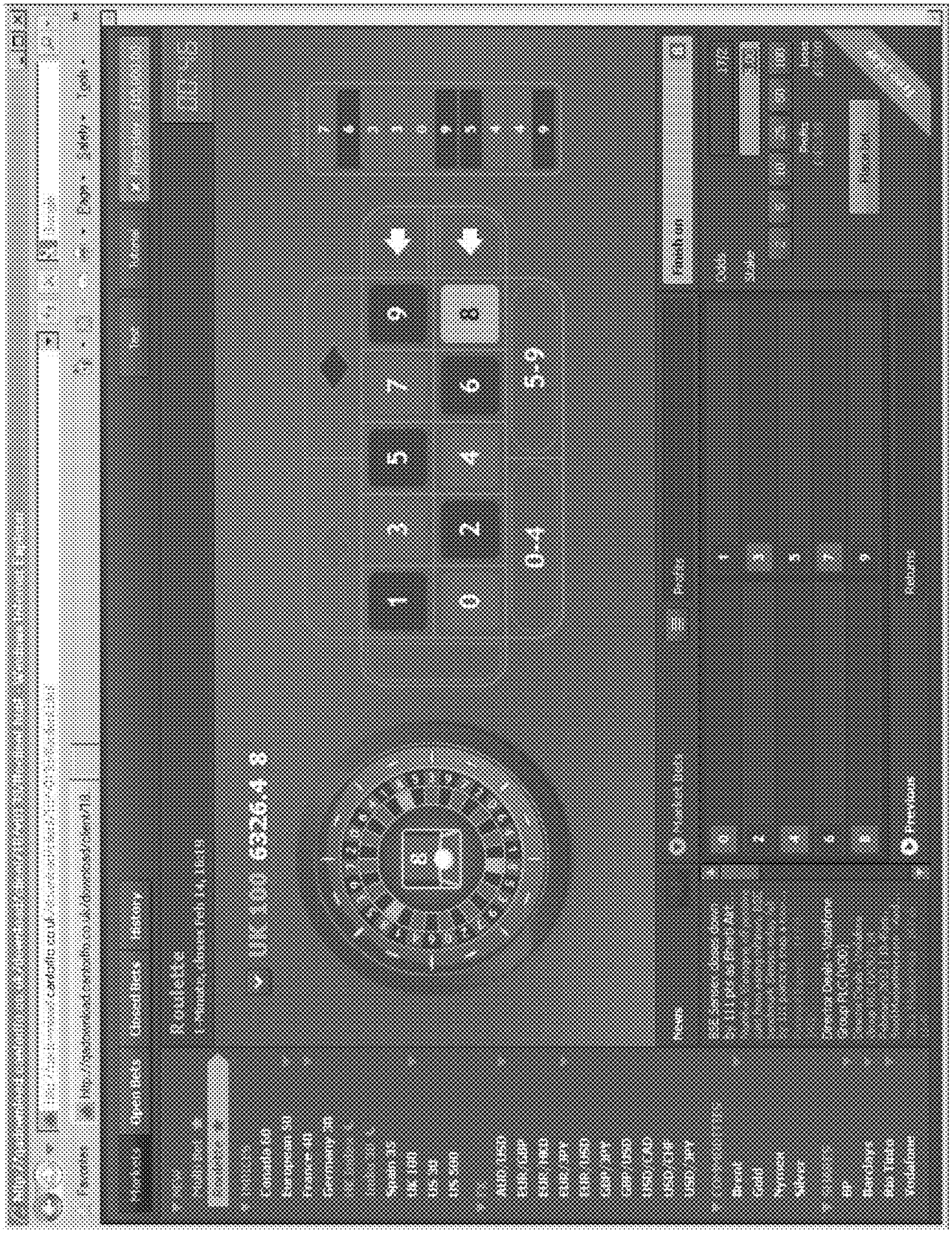
FIG. 22 depicts an exemplary screenshot of an interface according to an embodiment.

FIG. 22 depicts an exemplary screenshot of an interface according to an embodiment. The interface shows a sample bet, e.g., a bet made by a user. This bet may be made under the Free play setting of the game (free play tablet is red), or the bet may be made using real currency or value. The currently displayed winning number is shown to be 9 (though the game may not be finished yet, and the winning number may change). The number "8" is highlighted in yellow on the gaming table, indicated that "8" has been selected by the user, e.g., as a current bet selection. The bottom right hand corner of the interface shows that the odds of the bet winning are 17/2, and the stake is currently configured to be £5.00 (which is currently highlighted, indicating that the user may change the amount by entering a different number). The user is shown to have a possible £42.50 in gain/profit (e.g., if the bet wins) and £5.00 in losses (e.g., if the bet loses). (Notably, the odds (17/2) times the stake (£5.00) is equal to the amount that would be won (£42.50). In some embodiments, these amounts may represent the user's wins and losses (or expected or possible wins and losses) for a given betting session or time period such as a day or other time period.

Figure 23:
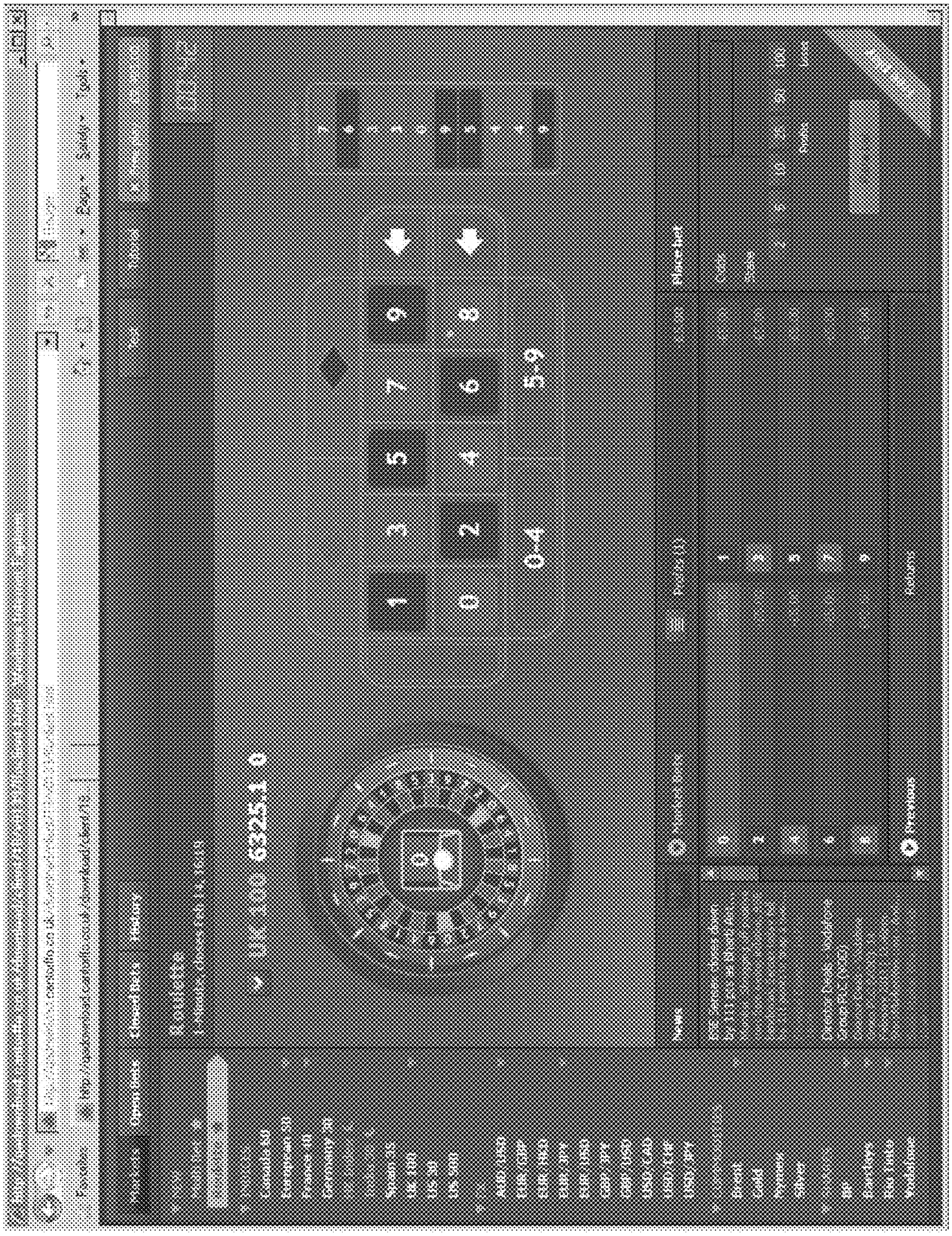
FIG. 23 depicts an exemplary screenshot of a user interface according to an embodiment.

FIG. 23 depicts an exemplary screenshot of a user interface according to an embodiment. In some embodiments, this screen may be shown after the user has submitted a wager of £5.00 on the number 8, but before the game has been resolved. Here, the timer may indicate that there are 42 seconds remaining in the game or betting session. The number in the winning number field is currently shown to be 0 (e.g., in response to the user selecting the row for "0" in the Market Bets section). As shown under the market bets tab in the middle, the user will lose the £5.00 stake on the bet on "8" if the result is a number other than 8. The user is shown to have £42.50 in possible profits or gains (in the "bet on 8" field) if the outcome is 8 wherein the bet on 8 would win. The number "0" and the associated £5.00 in potential losses is highlighted in red in the Market Bets field, and £5.00 is shown in the "Profits(1)" field, e.g., to indicate that this amount has been (or will be) deducted from the user's account if the outcome is the number zero.

For example, in response to the user selecting the number zero in the Market Bets field, the system may display in the Profits(1) field the amount that would be won or lost if the number zero is the outcome. Here, the number zero and its row in the Market Bets section may be highlighted in red to indicate that if a zero is the outcome, the user will lose money.

In some embodiments, the £42.50 indicated in the "bet on 8" field may represent an amount the user would win (e.g., for betting on 8 and/or for all of the user's bets in the game in total) if the outcome of the game is the number "8". The upper right hand corner timer shows that 49 seconds remain in the game or betting session. (Or in some embodiments, the time indicia shows that 49 second have lapsed since the game or betting session started.) Amounts of negative £5.00 are shown for each number other than 8, which may indicate that the user will lose this amount if the outcome is any number other than 8. In some embodiments, this may represent that the user will lose the user's stake in the bet on "8" (i.e., £5.00) if the outcome is any number other than 8.

Figure 24:
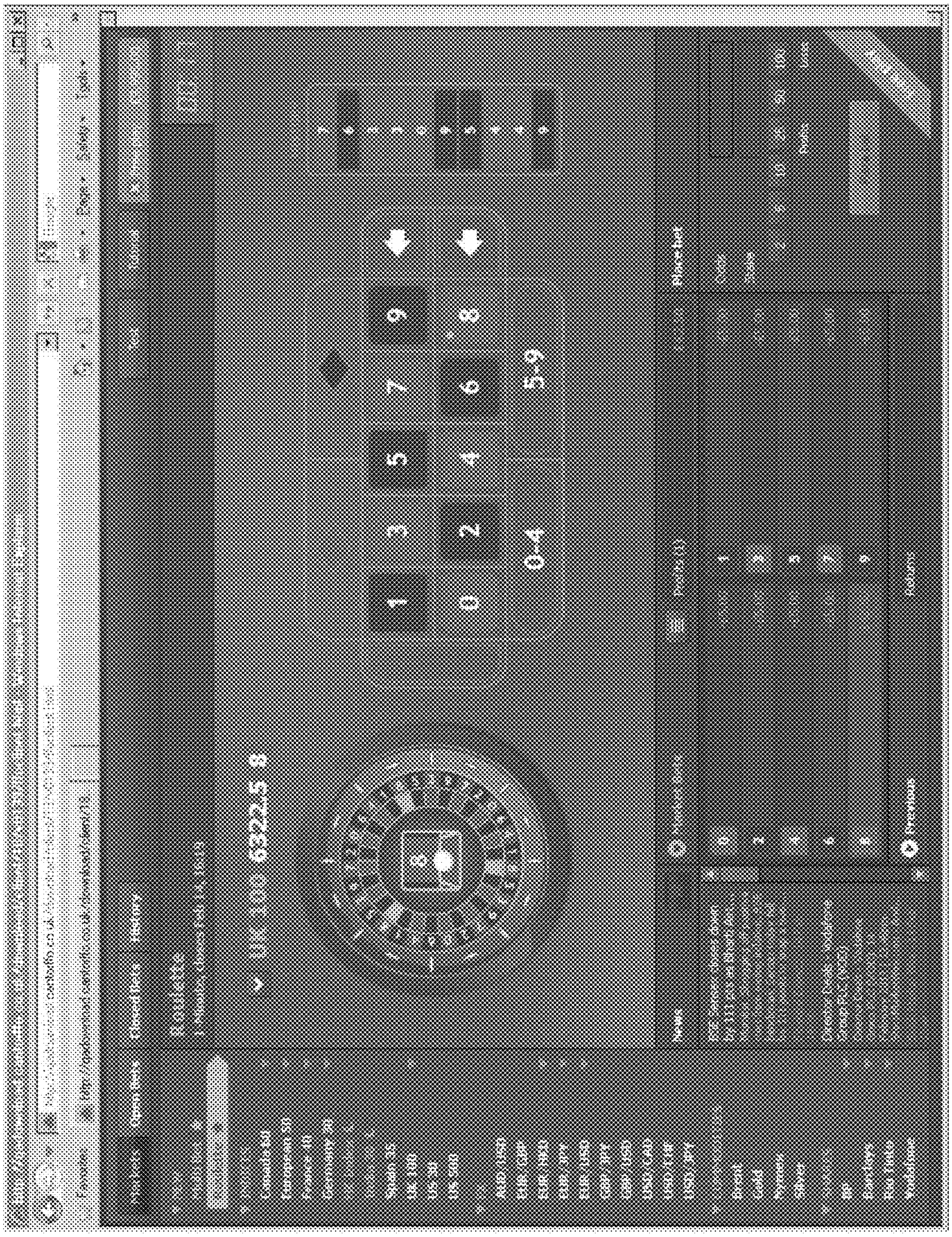
FIG. 24 depicts an exemplary screenshot of an exemplary user interface according to an embodiment.

FIG. 24 depicts an exemplary screenshot of an exemplary user interface according to an embodiment. This screenshot may appear when there are 17 seconds left in the game or betting session and the user has bet £5.00 on the number "8". Here, the winning number is displayed to be 8 (e.g., based on the user's selection of 8 in the Market Bets section). Under the market bets tab in the middle, the user will win £42.50 on his/her bet if an 8 is the outcome.

The number "8" and the associated £42.50 in potential profit is highlighted in blue in the Market Bets field, and £42.50 is shown in the "Profits(1)" field, e.g., to indicate that this amount will be added to the user's account if the outcome is the number zero. For example, in response to the user selecting the number eight in the Market Bets field, the system may display in the Profits(1) field the amount that would be won (or lost) if the number eight is the outcome. The number eight and its row may in the Market Bets section be highlighted in blue to indicate that if an eight is the outcome, the user will win money.

Figure 25:
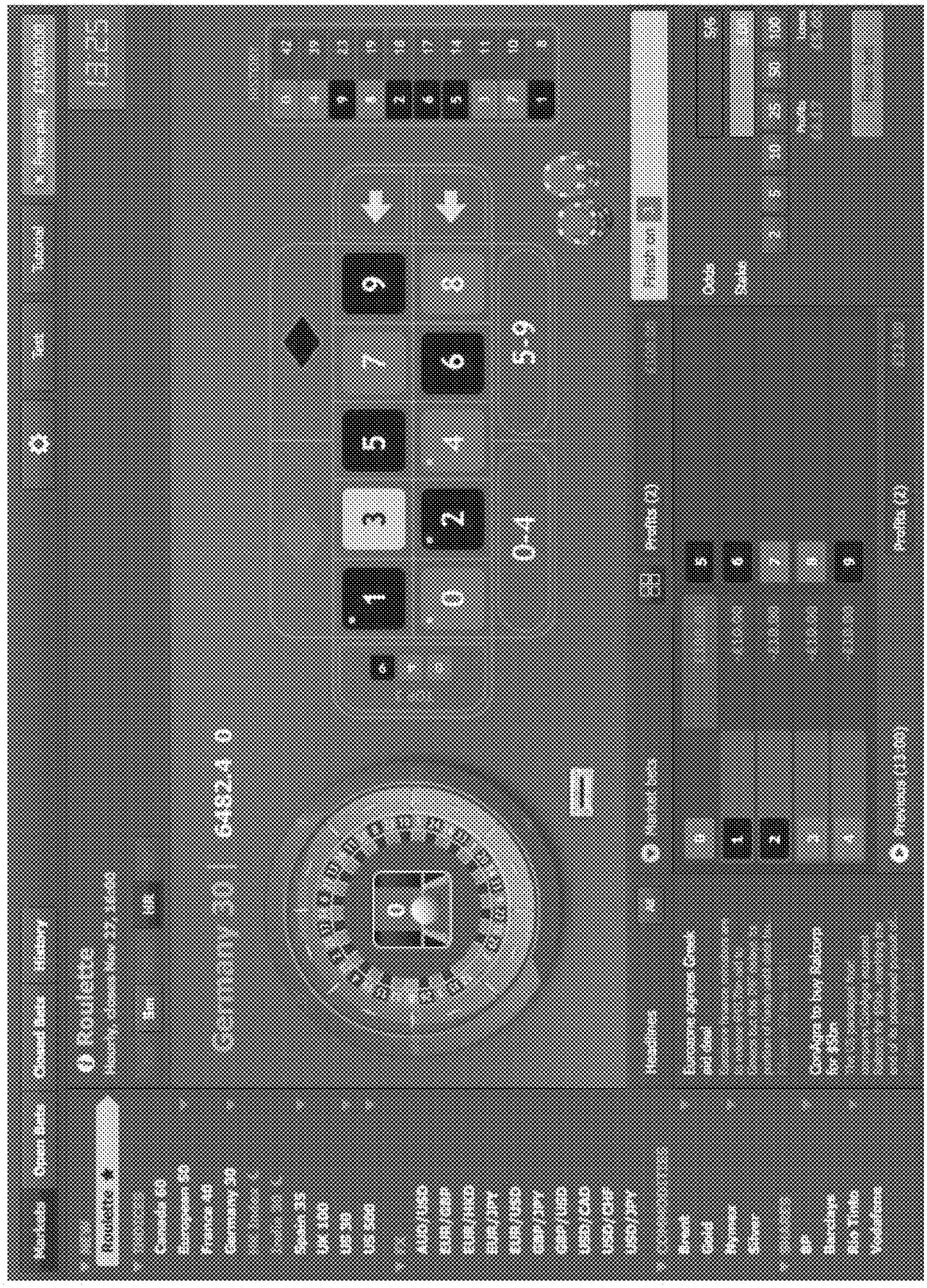
FIG. 25 depicts an exemplary screenshot of an exemplary user interface according to an embodiment.

FIG. 25 depicts an exemplary screenshot of an exemplary user interface according to an embodiment. The interface shows a user configuring one or more bets (e.g., bets on the number 0 and the number 3). Here, the winning number on the roulette wheel is currently indicated to be 0 (e.g., in response to the user selecting zero in the Market Bets field). The table may show (e.g., via dots) that bets have been placed on numbers 0-4. The market bets tab indicates that the user will win £100.00 on his/her bets so far (see profits tab next to Market Bets), e.g., if a zero is rolled. The odds of the current bet is shown to be 5/6 (e.g., for a bet on 3). The stakes of the current bet is currently configured to be £5.00. On the history tab to the right of the table, the number zero is shown to have been the outcome of the roulette game 42 times; the number four 39 times; the number nine 23 times; etc.

Financial Poker Game

An exemplary poker game may comprise an indicia of 5 (or more) poker cards, and two or more suits or colors (e.g., red, and black, or two or more suits like spades and diamonds), in which a number and a color may be identified by the last digit of the market. In some embodiments, users may bet on one or more of a) a specific number from 0 to 9, and b) red or black (or yellow). In some embodiments, each number 0-10 may be associated with either red or black. Alternately, one of four suits may be determined based on two financial market indicators, e.g., by using the last digit of each financial market indicator to determine a two digit number between 00 and 99, wherein 00-24 represents one suit (such as spades), 25-49 represents another suit (such as clubs), 50-74 represents another suit (such as hearts), and 75-99 represents another suit (such as diamonds). Accordingly, an outcome of a game may comprise two red 4s and three black 5s; or a 4 of diamonds, a 4 of hearts, and three 5s of spades.

In some embodiments, games as described herein may also use cards with one suit, or with three or more suits (e.g., four suits corresponding to spades, hearts, clubs, and diamonds). For example, cards may have suits that correspond to numbers (e.g., ten different suits corresponding to 0, 1, 2, 3, . . . 9). In some embodiments, each card may be generated based on one or more financial indicia.

In some embodiments, the last digit or other information associated with a financial indicia may be used to generate the number of the card. In some embodiments, additional information associated with the financial indicia or another financial indicia may be used to determine other information about the card, such as suit. For example, one financial indicator (e.g., the value of AUD/USD rate at a specified time) may be used to determine the card value (e.g., number), and another financial indicator (e.g., value of EUR/GBP at a specified time) may be used to determine the card suit (e.g., 0, 1, . . . 9). In other embodiments, two financial indicators may be used to determine suit, e.g., as described herein.

Figure 26:
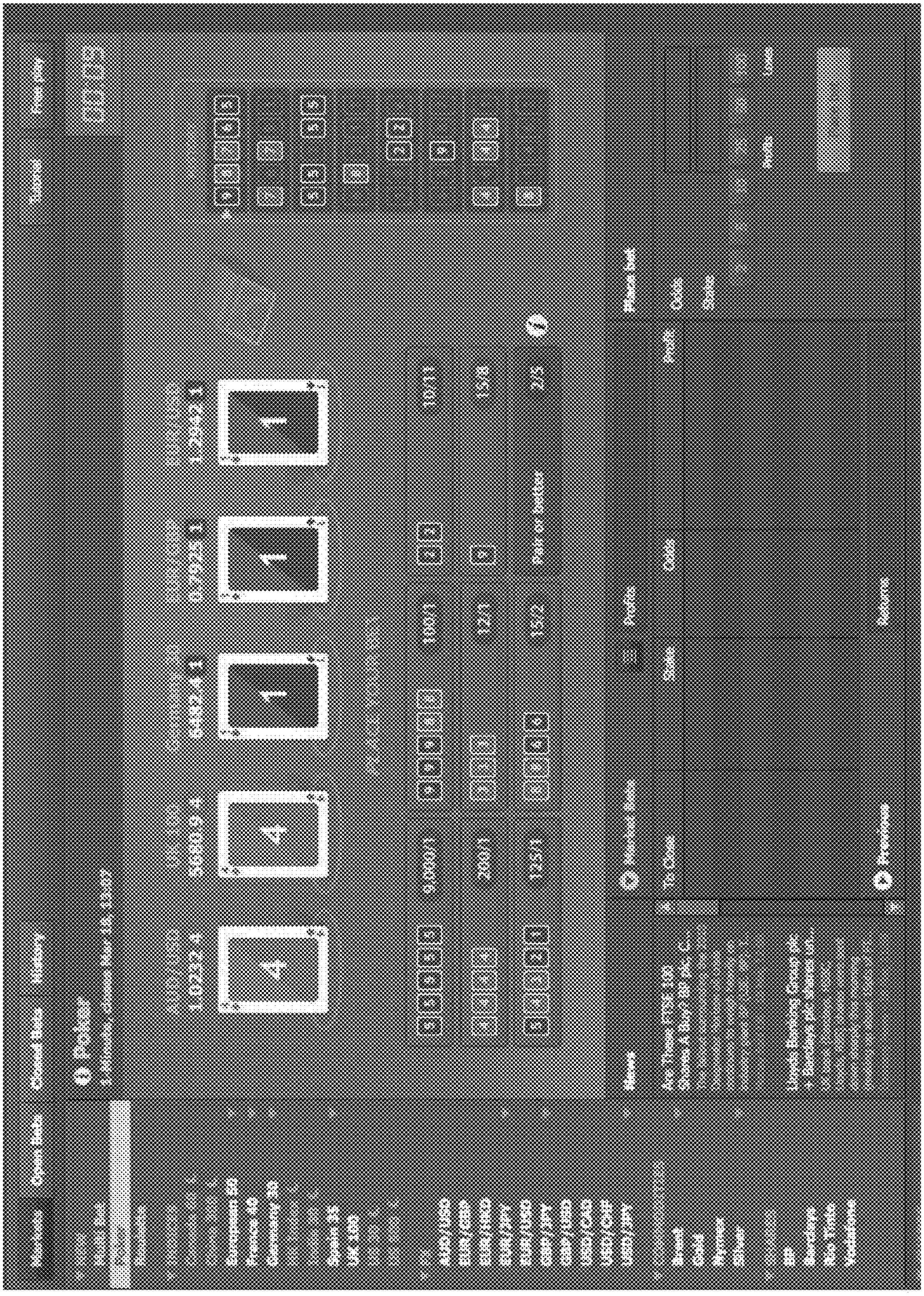
FIG. 26 depicts an exemplary screenshot of a user interface according to an embodiment.

FIG. 26 depicts an exemplary user interface according to an embodiment.

The game interface may be displayed at a user interface, such as a user computing device such as a touch-screen, phone, computer, or other device comprising a visual display. It should be appreciated that one, some, all, or any number of the various elements described below may be shown in a user interface in any suitable arrangement. User may select various elements, e.g., via mouse or touch-screen, to request betting information, place bets, clear a prior selection, change a stake, or perform any other gaming-related action.

The left side of the display may comprise various game options relating to game types and financial markets. Roulette may be highlighted in yellow to indicate that a roulette game has been selected here, and is currently being displayed. Alternately, the user may select another game type such as "Multi Bet."

Below the game types, the user may select a financial market or index, e.g., that will be used to generate the winning number in the roulette game. For example, the user may select an index such as Canada 60 or France 40, a foreign exchange market such as AUD/USD or EUR/GBP, a commodity market such as gold or silver, or a stock value such as BP shares or Barclays shares. Here, the UK100 market has been selected. Accordingly, the UK 100 index may be used to determine the winning number of the roulette game. The current (or substantially current) value of the UK100 (here, 6326.07) may be displayed on the gaming table area, indicated here in green. A drop-down icon to the left of the "UK 100" icon may be selected to generate a list of alternative markets that may be used for this game. In some embodiments, various options may be disabled or expire, e.g., at a predetermined time of the game, such as when the timer reaches 10 seconds, or on or just before the betting sessions ends.

The display may show a "gaming table" portion corresponding to elements of a real gaming table, highlighted here in blue. There are five slots in which the poker cards are placed. In one embodiment of the invention, the slots may be circles. The users may make bets by selecting one or more of the betting areas (e.g., by placing virtual chips on a selected area). The betting area has 6 boxes containing the various likely outcomes and the odds associated with each outcome.

Above each of the slots where the cards are placed, a financial number may be displayed, such as a value (such as a current market value or other price) of financial market, instrument, or index such as the UK 100 as displayed here. (Other financial markets may be used, e.g., by selecting such market from the list to the left of the gaming table.) Here, the current value (at the moment this particular screen is shown) of the AUD/USD index is shown to be 1.02324, wherein the 4 is the last significant digit show, the UK 100 index is shown to be 5680.94, wherein 4 is the last significant digit shown, the Germany 30 index is shown to be 6482.41, wherein 1 is the last significant digit shown, the EUR/GBP index is shown to be 0.79251, wherein 1 is the last significant digit shown, and the EUR/USD index is shown to be 1.29421, wherein 1 is the last significant digit shown. Accordingly, a full house is considered to be the winning bet, that is, the outcome that (if selected in a bet) would win if the game ended at that precise moment.

To the right of the table a history area may show a listing of the results of prior games, e.g., in chronological order. For example, the history area may indicate that the result of the last game was a straight, the next a pair of 7s, then four 5s, etc. Alternately, the history tab may show them in reverse chronological order, wherein the most recent result was an 8 (at the bottom of the history area), next last was three 4s, etc.

On the upper right hand corner, a time display may display an amount of time. The amount of time may comprise the current time, an amount of time remaining in a betting session, an amount of time available to place bets during a betting session before betting closes, an amount of time a game has been played, an amount of time until the next game starts, or any other amount of time.

On the bottom right hand corner, the odds (e.g., for a selected bet or bet type) and stakes (e.g., of a selected bet or bet type) may be displayed. A place bet tab may also be displayed. The amount a user can win or lose on a bet may be shown in 'profits' and 'losses'. The profits and losses field may display an amount that a user has gained (and/or lost) or could gain (or lose) in a current game, gaming session, day, week, period since last login, or other time period.

In some embodiments, the various values displayed may change right up until the moment the user clicks 'Place bet'. In the bottom middle of the screen is the Market Bets tab. In this tab, the user can track his/her bets and the profit and losses of each bet. The user can close his/her bets by clicking 'close' or 'close all.' A winning bet may be highlighted in blue. A losing bet may be highlighted in red. However, in some embodiments, closing a bet with a negative profit will result in less than the original stake being returned.

On the upper right hand corner of the screen, above the timer, Tutorial, and Free Play tabs may be displayed. The Test tab may allow the user to see if the game is compatible with their computer. The Tutorial tab may offer a guide on how to play the game. The Free Play tab may offer the user an opportunity to play the game without any monetary considerations, e.g., using fake money or gaming credit at no cost to the player.

On the bottom left hand side or the screen, next to the Market Bets tab, a running ticker may display pertinent current events/news of the day. On top of the game on the screen under the term "poker", an estimate is given as to when the market will close.

In some embodiments, games and associated betting sessions may start after (e.g., immediately after, or several seconds or minutes after) a prior one finishes. For example, a bet may start and/or stop every minute, for example. In some embodiments, a game may last one minute. During the first 50 seconds, players may join the game, configure settings, and configure and place bets. Betting may be closed at the end of 50 seconds. The game may conclude, and bets may be resolved and paid, at the end of 60 seconds. Other times and timings may be contemplated.

At the upper right hand corner of FIG. 26 is a timer, here indicating 9 seconds, which may comprise the amount of time remaining in the betting session or roulette game. The time may indicate a time, such as how much time remains in a game or betting session. Above the timer are two tabs—Tutorial (which described how to play the game), and Free Play (which allows the user to play the game for free).

In the middle of the Roulette wheel are 5 slots in which poker cards number 0-9 are revealed. Each slot corresponds to a specific market (here AUD/USD, UK 100, Germany 30, EUR/GBP, and EUR/USD). The poker card revealed may correspond to the last significant digit of the relevant market.

In the bottom right hand corner of the interface, an amount available to bet may be displayed (here, 10.00). The odds (e.g., for a selected bet or bet type) and stakes (e.g., of a selected bet or bet type) may be displayed. A place bet tab may also be displayed. The amount a user can or would win or lose (or has won or lost) on a bet may be shown in 'profits' and 'losses'. The profits and losses field may display an amount that a user has gained (and/or lost) or could gain (or lose) in a current game, gaming session, day, week, period since last login, or other time period.

Figure 27:
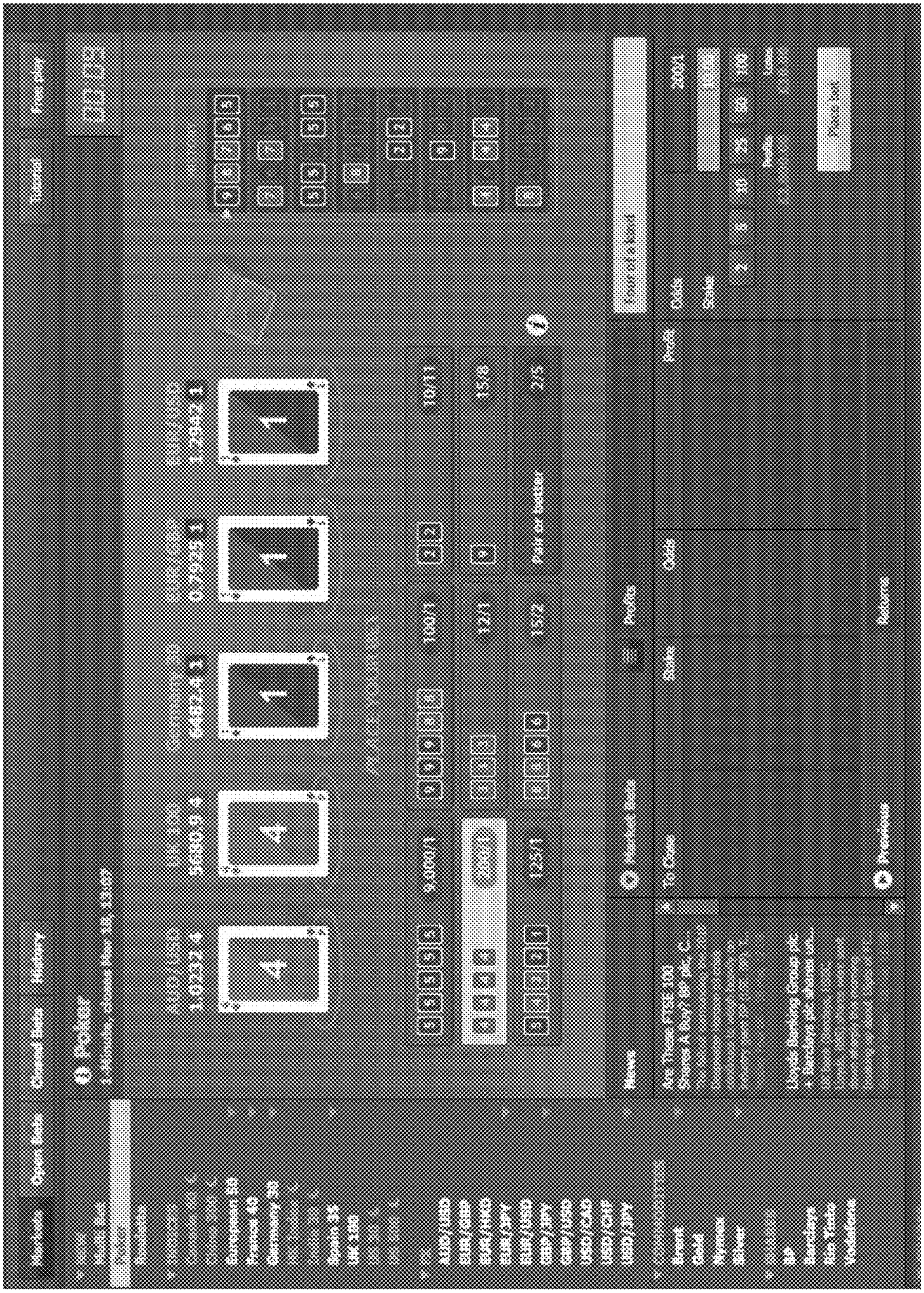
FIG. 27 depicts an exemplary screenshot of a user interface according to an embodiment.
Figure 28:
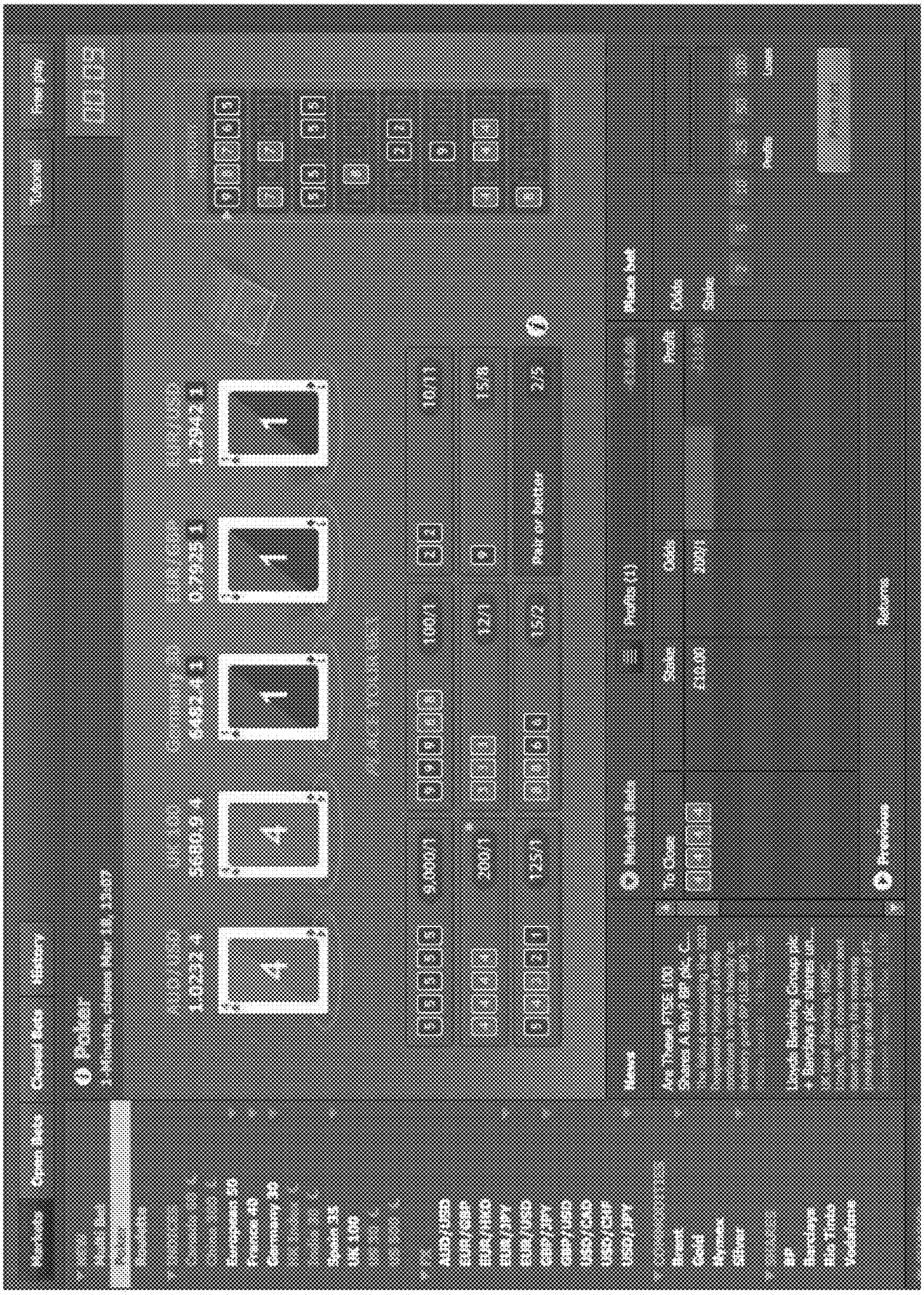
FIG. 28 depicts an exemplary screenshot of a user interface according to an embodiment.
Figure 29:
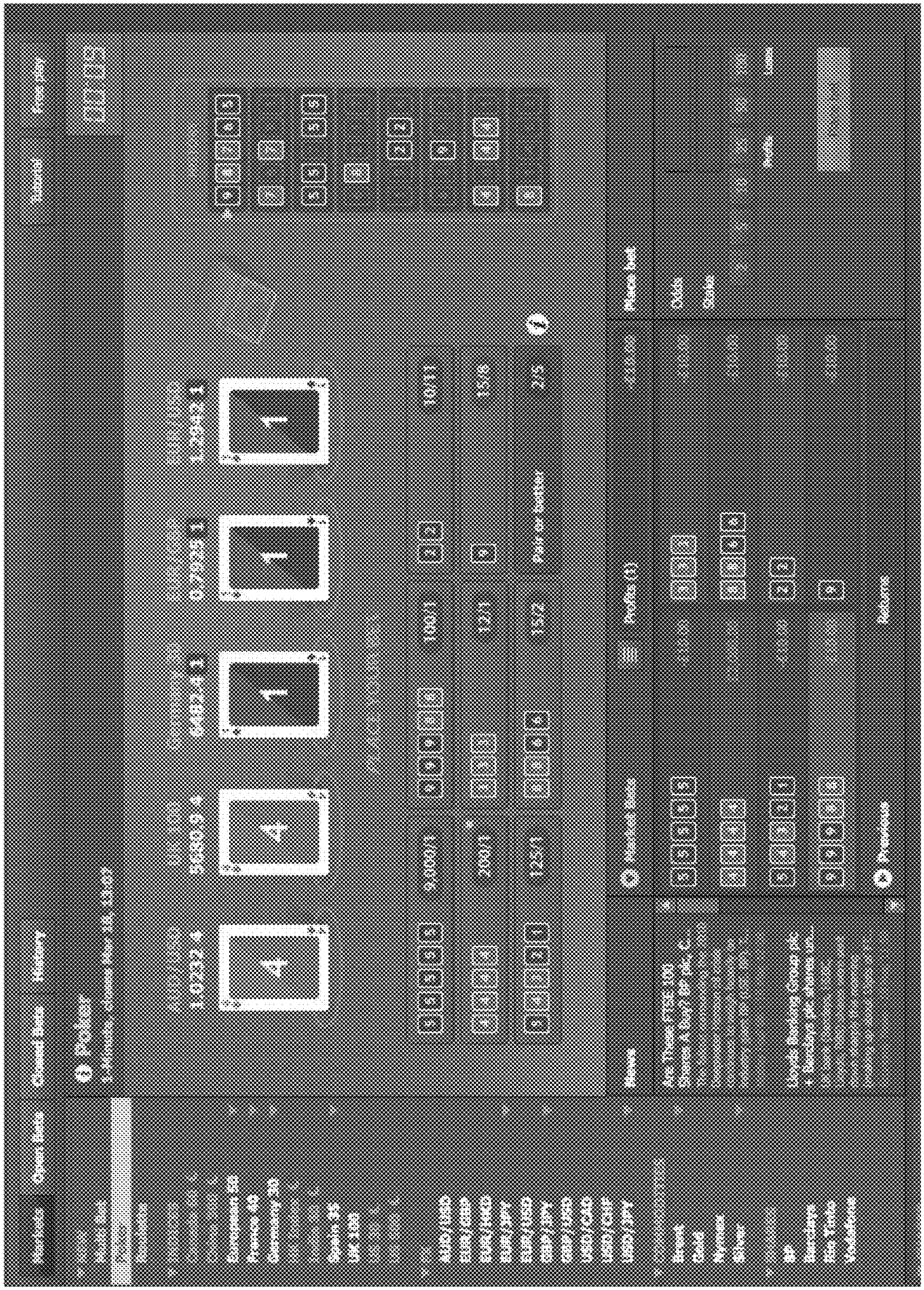
FIG. 29 depicts an exemplary screenshot of a user interface according to an embodiment.

It should be appreciated that many of the features shown in FIG. 26 also appear in some or all of FIGS. 27-29.

Accordingly, the description provided above for FIG. 26 may also in some embodiments apply equally to the similar features in FIGS. 27-29.

FIGS. 26-29 may indicate features associated with the same betting session, e.g., wherein the user bets on the number the winning suite of four of a kind.

FIG. 27 depicts an exemplary user interface according to an embodiment. The timer may show "9", indicating that there are 9 seconds remaining in the betting session or roulette game. For example, the interface of FIG. 27 may be displayed 9 seconds after the interface of FIG. 26. Various other Figures may display other times of the same gaming session.

The interface shows a sample bet, e.g., a bet made by a user. This bet may be made under the Free play setting of the game (free play tablet is red), or the bet may be made using real currency or value. The currently displayed winning number is shown to be 8 (though the game may not be finished yet, and the winning number may change).

Coincidentally, the hand four of a kind may also be highlighted in yellow on the gaming table, indicated that four of a kind has been selected by the user, e.g., as a current bet selection. For example, the hand four of a kind may be highlighted in yellow when the user clicks on the hand four of a kind icon on the gaming table, and/or when the user places or confirms a bet on the hand four of a kind. The bottom right hand corner of the interface shows that the odds of the bet winning are 200/1, and the stake is currently configured to be £10.00 (which is currently highlighted, indicating that the user may change the amount by entering a different number). The user is shown to have a possible £2,000.00 in gain/profit (e.g., if the bet wins) and £10.00 in losses (e.g., if the bet loses). (Notably, the odds (200/1) times the stake (£10.00) is equal to the amount that would be won (£2,000.00). In some embodiments, these amounts may represent the user's wins and losses (or expected or possible wins and losses) for a given betting session or time period such as a day or other time period.

FIG. 28 depicts an exemplary screenshot of a user interface according to an embodiment. In some embodiments, this screen may be shown after the user has submitted a wager of £10.00 on the hand four of a kind (e.g., by pressing the "place bet" button), but before the game has been resolved, e.g., while there is still 9 seconds left in the betting session or game.

The timer may indicate that there are 9 seconds remaining in the game or betting session. An indicator such as a small yellow dot (or other color or shape) in the upper right of the "four of a kind" field on the virtual game table may indicate that the user has placed a bet on the hand four of a kind. In some embodiments, the dot or other indicia may indicate or correspond to placing a chip or chips on a number in a real roulette game at a real roulette table. In some embodiments, the indicator may also display or indicate virtual chips or otherwise indicate the amount of the user's bet. The currently winning hand on the game board is currently shown to be a full house (e.g., because the last significant digit of each of the markets are 4, 4, 1, 1, and 1 respectively).

The Profits field (shown immediately to the right of the "Market Bets" heading) may show the gain/loss amount associated with the currently winning number in the Market Bets field (e.g., the amount the player would win or lose if the current number were the result of the game). Accordingly, the Profits field in FIG. 28 may show "−£10.00" to indicate that a full house is result, the player will lose his £10.00 betting stake on the hand four of a kind. The highlighting color may be red to indicate that this amount represents a net loss to the player instead of a win/gain (which may be highlighted in a different color such as blue). Similarly, negative numbers like "−£10.00" may be colored red to indicate a negative/loss amount, and positive numbers (such as "2,000.00") may be colored blue to indicate a positive/win amount.

It should be appreciated that the value of the index, the currently winning hand/result (here, a full house), the amount in the Profits tab, and the row that is currently highlighted in the Market Bets section may all change dynamically in real time or substantially real time as the value of the index changes.

FIG. 29 depicts an exemplary user interface according to an embodiment. Here, the winning indexes are 1.02324, 5680.94, 6482.41, 0.79251, and 1.29421, respectively. Thus the winning hand is a full house. The current bet is displayed to be a four of a kind. Under the market bets tab in the middle, the full house row, depicted with three 9s and two 8s row is highlighted in red, indicating the user has lost £10.00 on his/her £10.00 bet.

Poker game based on financial random number generators. With this Poker game, you bet on the hand that you predict will match the final digits of the market settle levels for five separate markets. For example, if the market settle level for AUS, UK, Germany, EUR/GBP, and EUR/USD is 1.02324, 5680.94, 6482.41, 0.79251, and 1.29421, the winning hand would be a full house. Similar to traditional betting, in various embodiments you can select to be on:

Pair or better at 2/5 odds;
A single 9 at 15/8 odds;
A pair at 10/11 odds;
Two pairs at 15/2 odds;
Three of a kind at 12/1 odds;
A full house at 100/1 odds;
A straight at 125/1 odds;
Four of a kind at 200/1 odds; or
Five of a kind at 9,000/1 odds.

Payout. Your bet may win if the market settle numbers (e.g., the final digits in the market settle level for the five markets depicted) equals the digit or suit of your bet.

Exemplary System

Figure 30:
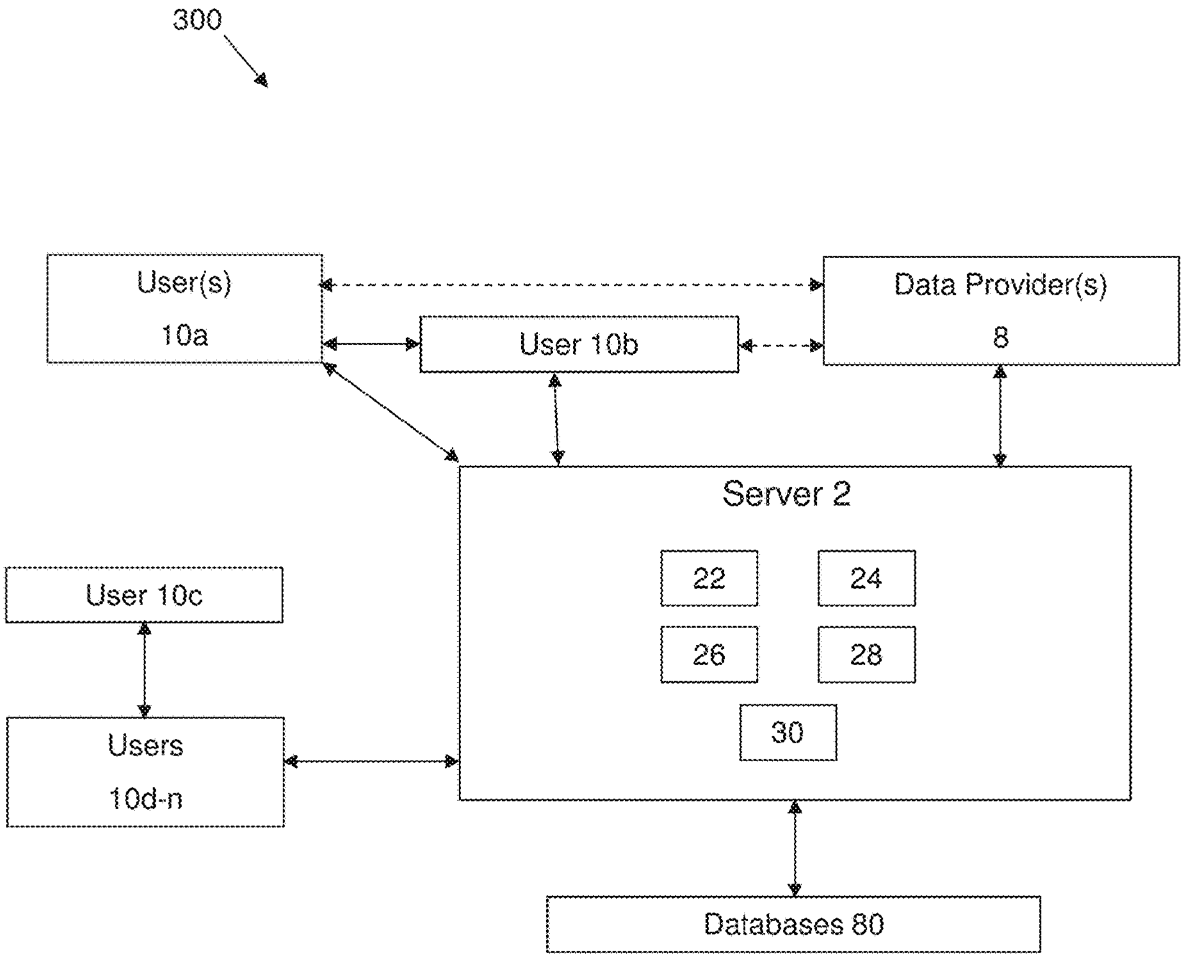
FIG. 30 depicts an exemplary apparatus according to an embodiment.

FIG. 30 depicts an exemplary apparatus according to an embodiment.

The system 300 may comprise one or more servers 2 coupled to one or more databases 80, one or more data providers 8*a*-8*n*, and one or more end users 10*a*-10*n*. The data providers 8*a*-8*n*, users 10, and server 2 may each communicate with each other. Users 10 may also communicate with other users 10, e.g., regarding a game, wager, and/or financial indicator.

Server 2 may comprise one or more processors, computers, computer systems, computer networks, and or computer databases. The one or more processors may execute software instructions, e.g., stored on computer-readable media, to perform the computer-implemented steps described herein. Server 2 may comprise modules 18-64. Server 2 may also comprise one or more databases, such as databases 80. Server 2 may communicate with users 10, and data providers 8. For instance, server 2 may communicate with a user 10 computer, such as a browser of a user computer, e.g., over the internet.

Databases 80 may comprise one or more processors, computers, computer systems, computer networks, and/or computer databases configured to store information. Each of databases 80 may communicate with server 2, e.g., via one or more modules of server 2. For instance, server 2 and modules may store information in databases 80 and may also use information stored in databases 80.

Users 10*a*-10*n* may comprise one or more human persons. Users 10 may interact with server 2, and/or other users 10. As used in this application, users 10*a*-10*n* may also refer to a user's interface to other system 300 components (like server 2), such as a user's PDA or computer or a program running on a user's computer such as a computer web browser like Internet Explorer™, which may communicate with data providers 8 and/or server 2.

Data provider(s) 8 may comprise any person, processor, information service, or other entity that publishes or otherwise provides information concerning a game, wager, financial market, financial indicator, random number generator, or communication related thereto, to server 2, and/or users 10. For example, a data provider 8 may comprise an entity that provides game-related information, wager-related information, and/or market information such as current prices and values of markets, indices, metrics, and other financial information described herein, such as a market data service, website, or other source of information relevant to gaming or financial markets, or any other information used by system or server as described herein.

Data provider 8 may provide information in real time, as information first becomes available to the general public, or at another time. Data provider 8 may provide such information in any one or more of a variety of forms and means such as video, audio (e.g., radio broadcast), text (e.g., stock ticker-type information), or other data that may convey information concerning games, wagers, financial markets, and other information. Data may be provided at a variety of different timings. In some embodiments, data may be provided in periodically, continuously, or continually, e.g., via a data feed (e.g., a stream of data that includes real time updates of event information, such as a running commentary of a game in text or audio format).

The server 2 may comprise a computer, server, hub, central processor, or other entity in a network, or other processor. The server 2 may comprise input and output devices for communicating with other various system 300 elements.

In some embodiments, the server 2 may be comprised in an end user's computer 10, e.g., as a toolbar in a user's web browser or another program running on the user's computer.

As shown in FIG. 1, the server 2 may comprise a plurality of modules, such as modules 22-34. Each module may comprise a processor as well as input and output devices for communicating with other modules, databases, and other system elements.

User interface module 22 may communicate with users, and enable users to communicate with server and other users. User interface module 22 may cause information to be output to a user, e.g., at a user output device such as a display device (e.g., a display device at a user terminal), and/or a speaker. For example, user interface module 22 may generate interactive user interfaces as shown in various figures described herein. The information outputted to a user may be related to a user account, one or more games, wagers, financial market indicators, user selections, and other information described herein. User interface module may communicate the information electronically, e.g., via networked communication such as the internet (e.g., in an email or webpage), telecommunication service, etc. In some embodiments, user interface module 22 may comprise input devices for users to information about one or more games, wagers, financial market indicators, or other information.

User interface module 22 may also enable users to interact with the various interfaces described herein, e.g., to select games (e.g., from a list of games), wagers (e.g., wager amounts and wager selections, such as red/black, straight, pair, the number 5, or any other selected information needed to specify a wager, or other information related to a wager), financial market indicators (e.g., that will be used for resolving a particular game or bet), game preferences, times, and other information.

User preferences module 24 may receive, identify, or determine user preferences concerning one or more games, wagers, financial market indicators, and other information. For instance, the module may receive the preferences from a user interacting with a user interface. The module may also receive them from an automated user terminal. The module may also determine them based on a program that automatically determines user preferences concerning one or more games, wagers, financial market indicators, and other information.

Financial information module 26 may determine financial information such as values or prices of financial instruments, markets, indices, e.g., based on information determined by server and/or received from one or more data providers. For example, financial information module may determine what the price or value of a financial market indicator is at a specific time for resolving a bet.

Payment module 28 may determine a payment (e.g., to be paid to or received by a user or server) for one or more bets made by user. For example, payment module may determine an amount (e.g., in dollars and/or points) to be paid to a user or credited to a user's account for winning a bet (or amount to be collected from a user or debited from user's account for losing a bet). Payment module may also credit and debit the user's account.

Game module 30 may conduct games, gameplay, and wagers. For example, game module may provide games, open For example, game module 30 may identify possible bets, open bets, prompt users to input a bet or betting information, specify odds and payouts, close bets, and resolve game and bet outcomes.

As shown in FIG. 30, a database 80 may be coupled to the server 2. Databases 80 may store information about users, games, wagers, financial data, and other information, such as historical information about game outcomes. The modules of server 2 may store, access, and otherwise interact with various sources of data, including external data, databases, and other inputs.

The modules may function separately or in various combinations. While the modules are shown within a single server, the modules may also operate among several servers. The modules may communicate with a plurality of databases, which may also function collectively or separately.

Exemplary Method

Figure 31:
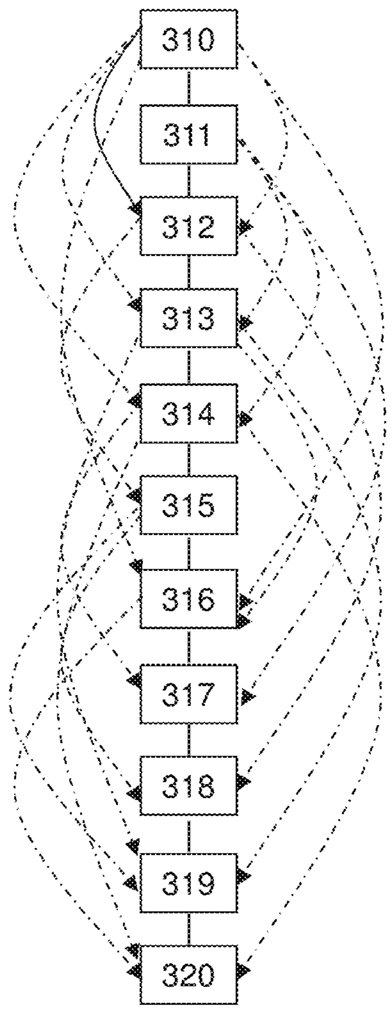
FIG. 31 depicts an exemplary flow chart according to an embodiment.

FIG. 31 depicts an exemplary flow chart according to an embodiment.

In block 310, the user may request a particular game or bet, such as a game of roulette or financial poker (as described herein).

In block 311, the system may initiate a game. The system may also open a betting market and accept bets. For example, the system may initiate a roulette game and request bets on the outcome of the game.

In block 312, one or more users may join a game. One or more users may invite other users to join the game.

In block 313, the system may prompt for input or other information, such as gameplay or information specifying a bet. For example, the system may prompt the user to select a roulette number, a possible hand of "cards," a betting amount, and one or more financial market indicators to resolve the bet.

In block 314, a user may input selections concerning a game, wager, and/or other information. For example, the user may input a bet (e.g., "three of a kind") and a wager amount.

In block 315, a user may communicate with other users. For example, a user may request to bet in the same game as one or more other users. A user may also request to bet against one or more other users. For example, a user may bet that another user's bet will win or will not win. A user may also bet on an outcome that is mutually exclusive to another user's bet. User interfaces may enable users to communicate with each other and with system to make such bets. The users' bets may be displayed to one another.

In block 316, the system may close the betting window, and/or stop allowing users to make bets or join a game. For example, the system may not allow any further bets on a specific game or event less than five seconds before the bet is resolved.

In block 317, the system may determine the value(s) of one or more financial market indicators that will be used to resolve a game or bet. For example, for a bet relating to the value of the S&P 500 at three seconds after 2:02 pm, the system may determine, in real time or substantially in real time (or at a later time), that the value of the S&P 500 at three seconds after 2:02 pm is 1502.739. The system may determine that the last digit of this value is 9, and this number may be used to determine one or more outcomes of a bet. The financial indicia may be determined based on information occurring after the betting market is closed. For example, a financial indicator's value at three seconds after 2:02 pm may be used if the betting market closes at 2:02 pm, or at another time prior to three seconds after 2:02 pm. In this way, users cannot determine the outcome of any betting variable before placing a bet.

In block 318, the system may determine the outcome of a game or bet. For example, the system may determine that the value of a user's card is "9" based on the determined value of the S&P 500. The user may also determine that a user's financial poker hand contains two pair: two nines, a one, a three, and two fours (e.g., based on a plurality of financial market indicators or other random number generators including the S&P 500). In block 319, the system may credit or debit a user's account based on the outcome of a user's bet. For example, the system may credit a user's account (e.g., with real currency, tokens, or other real or virtual value) if the user wins a bet, and debit a user's account when the user loses a bet. If a user bets against another user, the system may transfer the relevant bet amount from the account of the loser to the account of the winner.

In block 320, the system may initiate another game. For example, games of a particular type may occur at a plurality of designated times throughout the day, and/or periodically after one another.

It should be appreciated that exemplary methods may use some or all of the actions described in blocks 310-320, and the actions need not be performed in the order listed above.

The following are exemplary embodiments:

A. A method comprising:

transmitting to a user, by at least one processor, information comprising (1) information about one or more financial market indicators, (2) one or more betting parameters associated with an opportunity to place a wager on an outcome of a game, the one or more betting parameters comprising odds for at least a first of a plurality of possible outcomes of the game, and (3) a designated future time at which the outcome of the game will be resolved;

receiving from the user a request to bet on the first possible outcome of the game, the request comprising a wager amount;

causing to be displayed to a user, by the at least one processor, dynamically changing information about a current value of the one or more financial market indicators, in which the current value continually changes in real time;

determining, by the at least one processor, one or more values of at least one of the one or more financial market indicators, each value being a value of one of the one or more financial market indicators at the designated future time;

determining, by the at least one processor, an actual outcome of the game based on the one or more values at the designated future time;

determining that the actual outcome comprises the first possible outcome;

responsive to determining that the actual outcome comprises the first possible outcome, causing, by the at least one processor, a payout to be provided to the user based on the wager amount and the odds.

B. The method of embodiment A, further comprising:

transmitting to the user a list of financial market indicators, in which the list of financial market indicators comprises the one or more financial market indicators;

receiving from the user a selection of at least one of the one or more financial market indicators used to determine the outcome of the game.

C. The method of embodiment A, in which the game comprises roulette, and in which the act of determining an actual outcome of the game based on the one or more values at the designated future time comprises:

determining, by the at least one processor, an actual outcome of the game based on a last digit of one value of one financial market indicator.

D. The method of embodiment A, in which the game comprises a card game, and in which the act of determining an actual outcome of the game based on the one or more values at the designated future time comprises:

determining, by the at least one processor, a hand of cards comprising a plurality of cards, wherein a card value of each card is determined based on a last digit of each of a corresponding plurality of the one or more financial market indicators.

E. The method of embodiment A, in which the game comprises a card game, and in which the act of determining an actual outcome of the game based on the one or more values at the designated future time comprises:

determining, by the at least one processor, a hand of cards comprising a plurality of cards, wherein a suit of each card is determined based on a last digit of each of a corresponding plurality of the one or more financial market indicators.

F. The method of embodiment A, in which the one or more financial market indicators comprises one or more of a financial market index, a currency pair exchange rate, a price of a financial instrument.

G. The method of embodiment A, in which the game comprises a roulette game, and in which the outcome comprises a last digit of a financial market indicator as measured at the designated future time.

H. The method of embodiment A, in which the game comprises a roulette game, and in which the outcome comprises a two-digit number comprising a last digit of a first financial market indicator as measured at the designated future time and a last digit of a second financial market indicator as measured at the designated future time.

I. The method of embodiment A, in which the act of transmitting to a user information further comprises transmitting to the user information about a time remaining to place a wager on possible outcomes of the game, further comprising:

after the time remaining to place a wager has elapsed, transmitting a signal indicating that bets will no longer be accepted on the possible outcomes.

J. An apparatus, comprising:

at least one processor; and at least one memory having instructions stored thereon which, when executed by the at least one processor, direct the at least one processor to perform the method of any of embodiments A-I.

K. A computer-readable medium having instructions stored thereon which, when executed by at least one processor, direct the at least one processor to perform the method of any of embodiments A-I.

XII. Alternative Technologies

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

Modifications, additions, or omissions may be made to the disclosed methods and method steps without departing from the scope of the invention. The methods may include more, fewer, or other steps. Additionally, steps may be performed in any suitable order without departing from the scope of the invention.

While this disclosure has been described in terms of certain embodiments and generally associated methods, alterations and permutations of the various systems, methods, software, and other embodiments will be apparent to those skilled in the art. Accordingly, the above description of example embodiments does not constrain this disclosure. Other changes, substitutions, and alterations are also possible without departing from the spirit and scope of this disclosure, e.g., as defined by the claims herein.

In particular, it should be appreciated that while this disclosure has generally been described in reference to roulette and poker games, the features and embodiments described herein may also apply to other games, including other "card" games, slots, lottery, and other casino games, and other games and wagers that use one or more random number generators to determine an outcome of a wager or gameplay of a game.

XIII. References

It should be appreciated that various embodiments of the present invention may use one or more features, technologies, matching systems, execution systems, clearing systems, user configuration systems, brokering systems, and other features of any of the features disclosed in the following documents: U.S. Ser. No. 10/836,077, filed Apr. 29, 2004; U.S. Ser. No. 12/032,141, filed Feb. 15, 2008 (published as US 2009/0209312); U.S. Pat. Nos. 7,962,400; 7,566,270; and 8,267,403; the disclosures of which are hereby incorporated by reference herein in their entireties.

The invention claimed is:

1. A method for facilitating electronic exchange of data representing gaming and financial information over a network with graphical user interfaces of electronic device, the method comprising:

rendering, by at least one processor, at a display portion of a graphical user interface of, the display portion of the graphical user interface comprising:

(1) data representing information about a financial market indicator;

(2) data representing one or more betting parameters associated with an opportunity to place a wager on an outcome of a game, in which the one or more betting parameters comprises odds for at least a first of a plurality of possible outcomes of the game, each possible outcome of the plurality of possible outcomes corresponding to a digit value in a range of zero to nine; and (3) data representing information about a specified time at which the outcome of the game will be resolved;

receiving, by the at least one processor, from an input portion of the graphical user interface an electronic request to bet on a possible outcome of the game, the request comprising a wager amount, in which the interface comprises an indicia of the wager amount;

generating, via the at least one processor, a true random number based on continuous changes indicated in the data representing the information about the financial market indicator;

rendering, by the at least one processor, at the display portion of the graphical user interface a value of the financial market indicator based on the generated true random number, the displayed value comprising a plurality of digits including a least significant displayed digit, in which the least significant displayed digit changes during a duration of the game;

determining, by the at least one processor, the value of financial market indicator effective at a specified time;

determining, by the at least one processor, an actual outcome of the game based on a least significant displayed digit of the value of the financial market indicator effective at the specified time; and end the game when the value of financial market indicator effective is determined at the specified time.

2. The method of claim 1, in which the financial market indicator comprises one of a financial market index, a currency pair exchange rate, a price of a financial instrument.

3. The method of claim 1, wherein the game comprises a casino game.

4. The method of claim 1, the display portion of the graphical user interface further comprising: data representing indicia of a roulette-style wheel comprising a plurality of numbered slots, each of the plurality of numbered slots corresponding to a single digit selected from the group consisting of the ten digits zero (0) through nine (9).

5. The method of claim 1, further comprising:

transmitting information about a time remaining to place a wager on possible outcomes of the game; and after the time remaining to place a wager has elapsed, transmitting a signal indicating that bets will no longer be accepted on the possible outcomes.

6. An apparatus for facilitating electronic exchange of data representing gaming and financial information over a network with graphical user interfaces of electronic device, the apparatus comprising:

a memory;

at least one processor to:

render data representing information about a financial market indicator, data representing one or more betting parameters associated with an opportunity to place a wager on an outcome of a game, in which the one or more betting parameters comprises odds for at least a first of a plurality of possible outcomes of the game, each possible outcome of the plurality of possible outcomes comprising ten possible outcomes corresponding to a digit value in a range of zero to nine; and data representing information about a specified time at which the outcome of the game will be resolved;

detect from an input portion of a user interface an electronic request to bet on a possible outcome of the game, the request comprising a wager amount, in which the interface comprises an indicia of the wager amount;

generate a true random number based on continuous changes indicated in the data representing the information about the financial market indicator;

render a value of the financial market indicator based on the generated true random number, the value comprising a plurality of digits including a displayed least significant digit, in which the displayed least significant digit continually changes during a duration of the game;

determine the value of the financial market indicator effective at the specified time;

determine an actual outcome of the game based on a least significant displayed digit of the value of the financial market indicator effective at the specified time; and end the game when the value of financial market indicator effective is determined at the specified time.

7. The apparatus of claim 6, in which the at least one processor is further configured to receive, from the user, a selection from a list of selectable financial market indicators of the financial market indicator used to determine the actual outcome of the game.

8. The apparatus of claim 6, in which the financial market indicator comprises one or more of a financial market index, a currency pair exchange rate, a price of a financial instrument.

9. The apparatus of claim 6, in which the at least one processor is further configured to transmit information about a time remaining to place a wager on possible outcomes of the game; and after the time remaining to place a wager has elapsed, transmit a signal indicating that bets will no longer be accepted on the possible outcomes.

10. The apparatus of claim 6, wherein the game is a casino game.

11. The apparatus of claim 10, first the graphical user interface further comprising: (4) data representing indicia of a roulette-style wheel comprising a plurality of numbered slots, each of the plurality of numbered slots corresponding to a single digit selected from the group consisting of the ten digits zero (0) through nine (9).

12. The apparatus of claim 11, in which each single digit zero (0) through nine (9) corresponds to either a first color or a second color, in which each numbered slot corresponds to either the first color or the second color, and in which the interface comprises a first selectable indicia for wagering that the outcome of the game will comprise a digit corresponding to the first color and a second selectable indicia for wagering that the outcome of the game will comprise a digit corresponding to the second color.

13. The apparatus of claim 12, in which the interface further comprises:

an indicia of a numbered slot corresponding to a currently displayed least significant digit, in which the indicia of the numbered slot is separate from the plurality of numbered slots.

* * * * *